US006526462B1

(12) United States Patent
Elabd

(10) Patent No.: US 6,526,462 B1
(45) Date of Patent: Feb. 25, 2003

(54) PROGRAMMABLE MULTI-TASKING MEMORY MANAGEMENT SYSTEM

(76) Inventor: Hammam Elabd, 587 Middlebury Dr., Sunnyvale, CA (US) 94087

( * ) Notice: Subject to any disclaimer, the term of this patent is extended or adjusted under 35 U.S.C. 154(b) by 0 days.

(21) Appl. No.: 09/443,934

(22) Filed: Nov. 19, 1999

(51) Int. Cl.[7] ............................................. G06F 12/00
(52) U.S. Cl. ...................................... 710/242; 710/27
(58) Field of Search ................................ 710/242, 243, 710/308, 309, 119–125, 22, 27

(56) References Cited

U.S. PATENT DOCUMENTS

| | | | | | |
|---|---|---|---|---|---|
| 5,415,348 | A | * | 5/1995 | Nelson ................... | 239/222.11 |
| 5,764,999 | A | * | 6/1998 | Wilcox et al. .............. | 710/260 |
| 5,815,167 | A | * | 9/1998 | Muthal et al. .............. | 345/531 |
| 6,052,745 | A | * | 4/2000 | Miller et al. ................ | 365/221 |
| 6,240,492 | B1 | * | 5/2001 | Foster et al. ................ | 382/166 |

OTHER PUBLICATIONS

Cordan, Bill, "An Efficient Bus Architecture for System–on–Chip Design", *IEEE Custom Integrated Circuits Conference*, May 1999, pp. 623–626.
Rincon, Cherichetti, Monzel, Stauffer, Trick, Core Design and System–on–a–Chip Integration, IEEE Design & Test of Computers, Oct.–Dec. 1997, pp. 26–35.
Young, "Performance and Versatility: The PowerPC 405 Core", Micronews, First Quarter 1999, 'Online! vol. 5, No. 1, Jan. 1999, pp. 1–5.
Buender, M., "The 1999 Custom Integrated Circuits Conference", 'Online!, Oct. 1999, pp. 1–2.

\* cited by examiner

*Primary Examiner*—Paul R. Myers
(74) *Attorney, Agent, or Firm*—Pillsbury Winthrop LLP

(57) ABSTRACT

A highly intelligent programmable multi-tasking memory management system manages memory requests associated with a system on chip (SOC) device. The memory management system includes a routing controller or central processing unit (RCPU) that is used for routing/switching stream data between communication cores and digital signal processors with minimum reliance and demand on a main or virtual central processing unit (VCPU) residing on a system bus. Tasks are partitioned between the VCPU and the RCPU within the SOC architecture for communication applications. The VCPU performs system/application tasks while the RCPU simultaneously performs multiple memory routing/switching tasks and multiple concurrent memory access connections. The memory management system also enables other processors and communication cores to update their internal data once new data is written in the memory system. In addition, a method and system are provided for performing predictive protocol fetch for multiple DSPs on the SOC to increase data processing throughput.

17 Claims, 17 Drawing Sheets

6 MASTERS, 4x32 BIT BUSES, 6 MEMORY BANKS

EXAMPLE OF SCHEDULING AND ARBITRATION

| CLOCK CYCLE | REQUESTS | SCHEDULE |
|---|---|---|
| 1 | M1 TO MEM1  M4 TO MEM3<br>M2 TO MEM2  M5 TO MEM5<br>M3 TO MEM2  M6 TO MEM6 | |
| 2 | M4 TO MEM2 | M1 TO MEM1<br>M2 TO MEM2<br>M4 TO MEM3<br>M5 TO MEM5 |
| 3 | M3 TO MEM1<br>M1 TO MEM4 | M3 TO MEM2<br>M6 TO MEM6<br>M4 TO MEM2<br>REFRESH MEM1 |
| 4 | | M3 TO MEM1<br>M1 TO MEM4<br>REFRESH MEM4<br>REFRESH MEM5 |
| 5 | | REFRESH MEM2<br>REFRESH MEM6<br>REFRESH MEM3 |

BOOT UP SEQUENCE

PROGRAMMABLE MULTI-TASKING MEMORY MANAGEMENT SYSTEM

FIELD OF THE INVENTION

The present invention relates to a programmable multi-tasking memory management system, and more particularly, to a system and method for managing requests for memory associated with a system on chip (SOC) architecture. The multi-tasking memory management system of the present invention includes a routing controller or central processing unit (RCPU) that is used for routing/switching high rate stream data between communication cores and digital signal processors with minimum reliance and demand on a virtual central processing unit (VCPU) running the application software and the system bus. The present invention is further directed to a system and method for partitioning tasks between the RCPU and the VCPU within the SOC architecture.

BACKGROUND OF THE INVENTION

A system on chip (SOC) product provides many advantages and benefits over a traditional, separate component integrated circuit (IC) product. The separate IC product generally includes components that are connected to each other on a printed circuit board. Alternatively, an SOC product is designed such that an entire system (processors, memory, logic, clock, I/O control unit, etc.) can be implemented or embedded on a single chip, thereby producing a product that is smaller, faster, and more efficient than the separate IC product. Each SOC product has at least the following three components in common: embedded processor (e.g., ARM, LEXRA, MIPS, ARC, DSP core); memory; and logic.

Using SOC technology, the overall size of the end product is reduced because manufacturers can put major system functions on a single chip, as opposed to putting them on multiple chips. This reduces the total number of chips needed for the end product.

In addition, SOC products provide faster chip speeds due to the integration of the components/functions into one chip. Many applications such as high-speed communication devices (VoIP, MoIP, wireless) require chip speeds that may be unattainable with separate IC products. This is primarily due to the physical limitations of moving data from one chip to another, through bonding pads, wires, buses, etc. Integrating chip components/functions into one chip eliminates the need to physically move data from one chip to another, thereby producing faster chip speeds. Further, the SOC product consumes less power than the separate IC product since data do not need to be moved from one chip to another.

Another advantage of using the SOC product is that it less expensive for the manufacturer because of the reduced number of chips used in the end product. Packaging costs, which can be significant, are likewise reduced as a result of having fewer chips. Thus, SOC products are becoming ever more popular and are widely used in many applications such as in Internet products.

FIG. 1 illustrates a block diagram of a conventional SOC architecture. In the conventional SOC architecture, there may be multiple processors such as DSP 2 and CPU 4 connected to a system bus 24. Only two such processors are illustrated herein, but it is understood that multiple DSPs, CPUs, or any other kinds of processors can be used, which are also connected to the system bus 24. Other functions/devices that are connected to the system bus 24 include DMA (Direct Memory Access) 6, GPIO (general purpose I/O unit) 8, arbiter 10, interrupt controller 12, and internal/external memory 16. Other conventional devices, which are not illustrated herein, may also be connected to the system bus 24. A bridge 14 can further be used to connect the system bus 24 to a peripheral bus 26. The peripheral bus 26 connects lower rate stream data communication cores such as MAC 10/100 Ethernet 18, AC97 20, and USB 2.0 UDC 22, and the like for concurrent and independent operation from the devices that are directly connected to the system bus 24.

During operation, the peripheral devices (MAC 10/100 Ethernet 18, AC 97 20, USB 2.0 UDC 22) using the bridge 14 will interrupt the processor (i.e., CPU 4) and attempt to become "masters" of the system bus 24 in order to access the internal/external memory 16 using the DMA 6. The DMA 6 is a direct memory access device that allows a peripheral device (master) to access the internal/external memory 16 without requiring the assistance of the processor (i.e., CPU 4) on the system bus 24. The DMA 6 will generally use an internal 32 bit FIFO for temporary storage of the DMA data. Source and destination addresses can be aligned on any byte address boundary using this method. When the peripheral master occupies the system bus 24 and interfaces with the memory 16 for an extended period of time, a time-out feature can be used to break off the connection between the peripheral master and the system bus 24 to allow the processors 2, 4 to access the system bus 24.

Alternatively, the CPU 4, in the case of a cache line-miss, will read the cache line from the internal/external memory 16. In the case where multiple masters (e.g., DSP 2 and CPU 4) attempt to access the internal/external memory 16 simultaneously, there will likely be conflicts and so-called "bottleneck" problems. Such problems occur because the requests from the masters will be transmitted simultaneously to the internal/external memory 16, and conventional systems will not be able to process such requests at the same time. The arbiter 10 will essentially control the arbitration and scheduling scheme of the masters so that priority is given to a particular master on the system bus 24. In other words, the arbiter 10 will decide which master will control the system bus 24 at a given time. One particular master will have control over the system bus 24 at the given time and will prevent other masters, including peripheral masters, from accessing the system bus 24.

One major problem associated with such a conventional SOC system is that many masters would be required to read/write from/to the internal/external memory 16 during the same clock cycle, which is not possible and thus will cause delays and conflicts among them. At times, the masters will attempt to read/read from/to a different location (i.e., memory banks) on the memory, while at other times, the masters may attempt to read/write from/to the same location (i.e., memory bank).

Another problem associated with the conventional SOC system is that there may be multiple peripheral masters or communication cores (e.g., 30 or more) in the SOC architecture requesting access to the memory 16. For each memory request from the peripheral master, the CPU 4 will need to process an interrupt, read/write data length and availability registers and connect the peripheral bus 26 to the system bus 24. As a result, the CPU 4 may not be able to efficiently perform general system/application tasks since each interrupt consumes tens or hundreds of CPU 4 clock cycles.

Thus, there is a need for a highly intelligent memory management system that allows the main or virtual CPU (VCPU) to perform system/application tasks without having to perform memory routing/switching tasks requested by the peripheral devices. There is also a need to keep all the masters in the SOC architecture satisfied by processing and/or predicting the memory requests and enabling masters to update their internal data once new data is written in the memory.

SUMMARY OF THE INVENTION

It is an object of the present invention to provide a programmable multi-tasking memory management system.

It is another object of the present invention to provide a system and method for managing requests for internal/external memory associated with a system on chip architecture.

It is a further object of the present invention to provide a system and method for simultaneously processing multiple memory requests from multiple masters using the multi-tasking memory management system.

It is yet another object of the present invention to provide a system and method for transmitting memory requests from multiple masters to the multi-tasking memory management system using dedicated memory buses.

It is another object of the present invention to provide a novel arbitration and scheduling and load balancing (between memories) scheme using the multi-tasking memory management system of the present invention.

It is a further object of the present invention to provide a system and method using a routing CPU and multiple buses in the multi-tasking memory management system to achieve multiple word data access/clock cycle.

It is another object of the present invention to provide an intelligent memory management system to keep all the masters satisfied by processing and/or predicting the memory requests from multiple masters.

It is still a further object of the present invention to provide an intelligent memory management system that enables masters to update their internal data once new data is written in the memory system.

It is yet another object of the present invention to provide an intelligent memory management system that allows the main or virtual CPU to perform system/application tasks without the virtual CPU having to perform memory routing/switching tasks requested by the peripheral devices.

It is a further object of the present invention to provide an intelligent memory management system that allows a virtual CPU to perform system/application tasks while a routing CPU in the memory management system performs memory routing/switching tasks associated with the peripheral devices.

It is yet a further object of the present invention to provide an SOC system that partitions tasks between the virtual CPU and the routing CPU.

These and other objects of the present invention are obtained by providing a software programmable multi-tasking memory management system. The memory management system of the present invention includes an embedded routing CPU with configurable memory controllers and interface. Dedicated memory buses and high speed multiplexers are used to connect/switch and transmit memory requests from multiple masters to the multi-tasking memory management system. In this manner, the multi-tasking memory management system is capable of processing multiple memory requests simultaneously (i.e., in parallel). The present memory management system supports conversion of serial/parallel and parallel/serial of stream data to 8, 16, 32, ..., 2048 bit wide buses.

The highly intelligent memory management system of the present invention includes a routing CPU to perform memory routing/switching tasks requested by the peripheral devices. In this manner, the virtual CPU primarily performs system/application tasks while the routing CPU primarily performs memory routing/switching tasks associated with the peripheral devices. The present invention provides methods and systems for partitioning tasks between the virtual CPU and the routing CPU for communication applications. Stated alternatively, the present invention partitions specific tasks among the VCPU and the RCPU for a more efficient and beneficial SOC system.

According to another aspect of the present invention, a method and system is provided herein for performing predictive protocol fetch for multiple DSPs on an SOC to increase data processing throughput. In addition, a digital data packet cross bar switching system that connects multiple communications networks through multi-width buses is disclosed herein.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
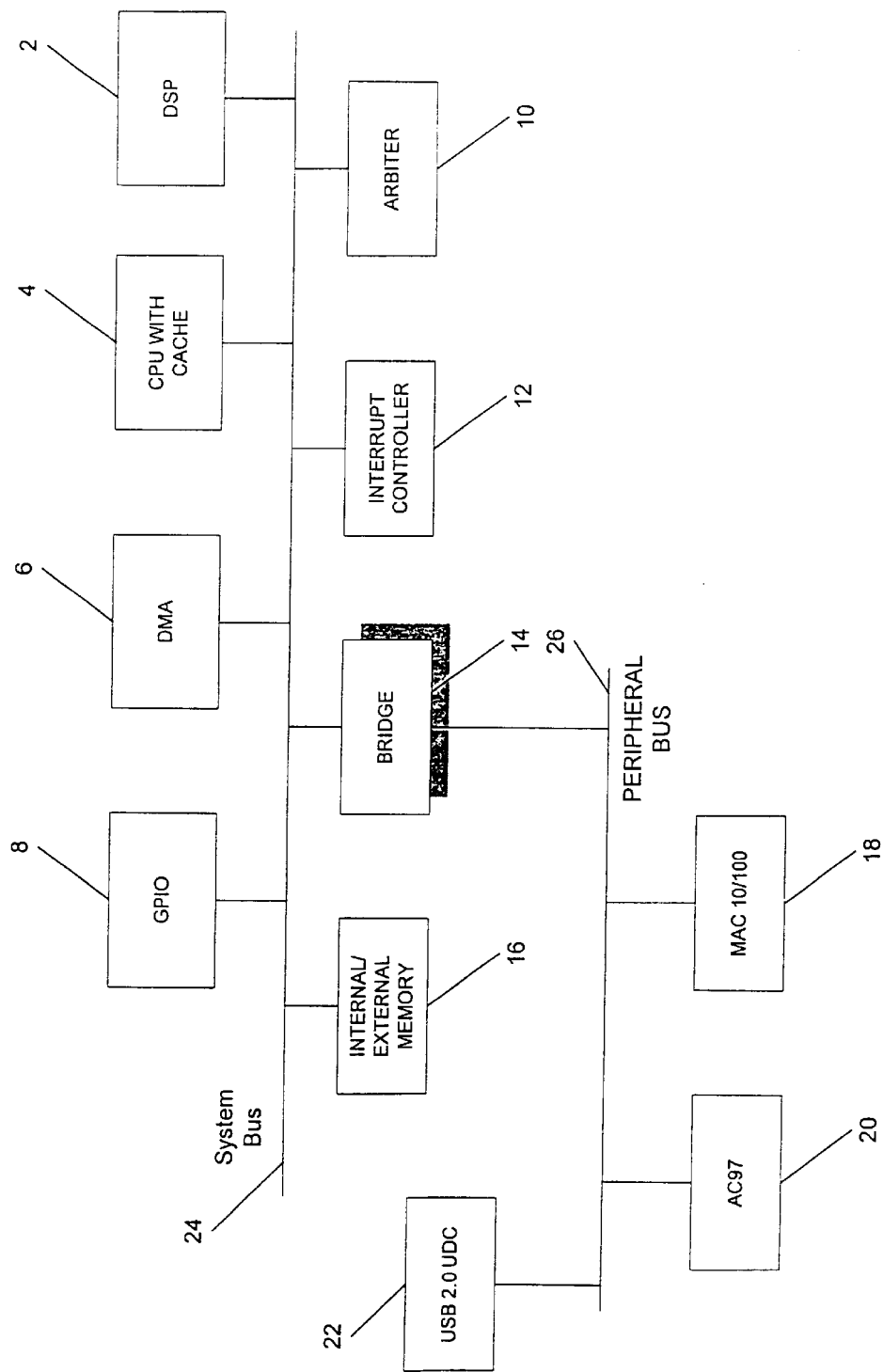
FIG. 1 illustrates a block diagram of a conventional SOC architecture.

The present invention will be described in greater detail, which may serve to further the understanding of the preferred embodiments of the present invention. As described elsewhere herein, various refinements and substitutions of the various embodiments are possible based on the principles and teachings herein.

The preferred embodiments of the present invention will now be described with reference to FIGS. 2–12, wherein like components and steps are designated by like reference numerals throughout the various figures. Further, specific parameters such as bus sizes, arbitration schedules, processor speeds, data rates, and the like are provided herein, and are intended to be explanatory rather than limiting.

Figure 2:
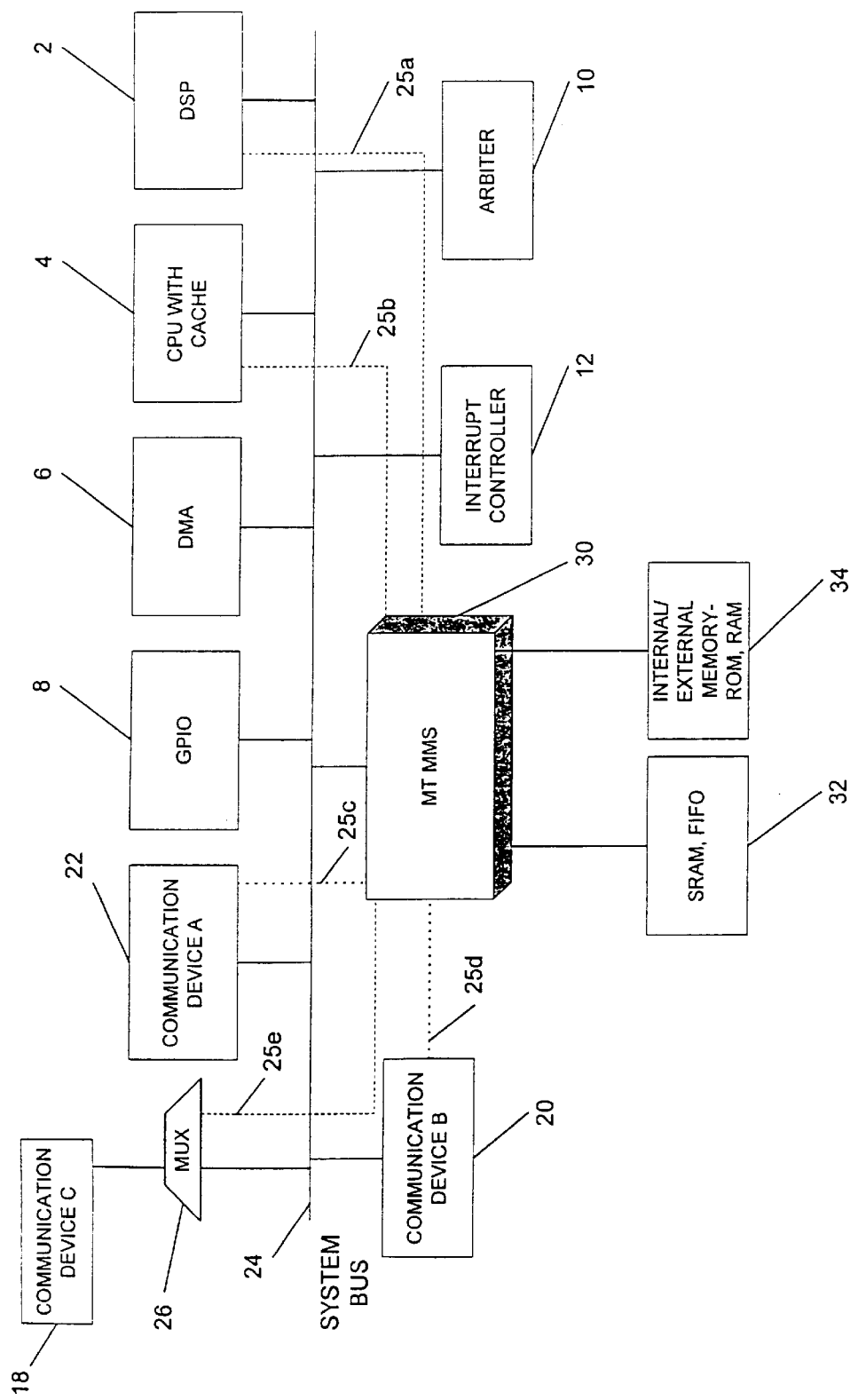
FIG. 2 illustrates a block diagram of an SOC architecture having a multi-tasking memory management system in accordance with a preferred embodiment of the present invention.

FIG. 2 illustrates a block diagram of an SOC architecture having a multi-tasking memory management system (MT MMS) in accordance with a first preferred embodiment of the present invention. The term "master" used herein describes the various DSPs, CPUs, and communication/data devices (MAC 10/100 Ethernet, AC 97, USB 2.0 UDC, T1/E1, etc.) that are capable of reading/writing from/to the external memory. It is understood that two or more masters may simultaneously send read/write requests to different or same locations in an external memory. The MT MMS of the present invention includes a configurable routing CPU (RCPU) and flexible interface. The MT MMS described herein is an intelligent device on the SOC product that manages the memory requests from multiple masters. In other words, the MT MMS makes the SOC product as efficient as possible by processing multiple memory requests simultaneously. The RCPU can configure the bridges on the master's bus to "master mode" so that it can DMA into the master's cache any data content that has changed in the memory in order to maintain cache coherency, as will be described in more detail later herein. Alternatively, it can interrupt the VCPU and provide it with the address of updated memory.

FIG. 2 illustrates a DSP 2, CPU 4, DMA 6, GPIO 8, arbiter 10, and interrupt controller 12 all connected to a system bus 24, similar to that described in the background section. Communication devices 20, 22 are also connected to the system bus 24 as shown. Other communication devices such as communication device 18 are coupled to a MUX 26 to generate control bus and memory bus branches for concurrent operation/accesses to the control status registers (CSR) and data memory, which in turn is connected to the system bus 24 and an MT MMS 30. The system bus 24 is an arbitrated bus controlled by the arbiter 10, as described earlier herein.

In the embodiment presented herein, the MT MMS 30 is connected to the system bus 24 and various other memory masters. The MT MMS 30 receives all external memory requests from various masters and processes such requests. The memory types that are accessible using the MT MMS 30 include SRAM FIFO memory 32 or internal/external memory 34 such as ROM or RAM. Other memories such as VC-SDRAM, Flash SDRAM, and the like can also be accessible using the MT MMS 30.

Each master (DSP, CPU, communication devices, etc.) is interfaced to the MT MMS 30 via the main system bus 24 for control and status operations and a corresponding memory bus (thread) 25a, 25b, . . . 25n for data operations. The dedicated memory buses 25a, 25b, . . . , 25n are shown by the dashed lines. The read/write requests are sent from the masters to the MT MMS 30 via the memory buses 25a, 25b, . . . 25n. It is important to point out that unlike the system bus 24, the memory buses 25a, 25b, . . . 25n are not arbitrated/controlled by any arbiter, except at the input of the MT-MMS 30, as described more fully later herein. When the masters request a read/write, the memory addresses are decoded only through the memory buses 25a, 25b, . . . 25n, and not through the system bus 24. However, the system bus 24 may still decode other addresses such as the command and control registers of an I/O or communication device. As a result, the MT MMS 30 of the present invention can receive and process multiple requests simultaneously from multiple masters via the memory buses 25a, 25b, . . . 25n.

When read/write requests are sent from the masters to the MT MMS 30 via the memory buses 25a, 25b, . . . 25n, a system is created with very low latency between the master's request time and the time when the request is processed. In one embodiment, the memory buses 25a, 25b, . . . 25n are made up of 32 bit address lines, 32 bit data lines, and 7–10 control wires, and the MT MMS 30 can be a 150 MHz or higher device capable of receiving a read/write request of 128 bits or more simultaneously.

As mentioned above, the MT MMS 30 includes a RCPU that manages the memory requests by routing/switching them between the masters. This aspect of the present invention is described in more detailed later herein. The RCPU's primary function is to manage memory requests, which allows the main or VCPU to primarily process system/application software requests. In this manner, tasks are partitioned between the RCPU and the VCPU for a more efficient SOC system.

Figure 3:
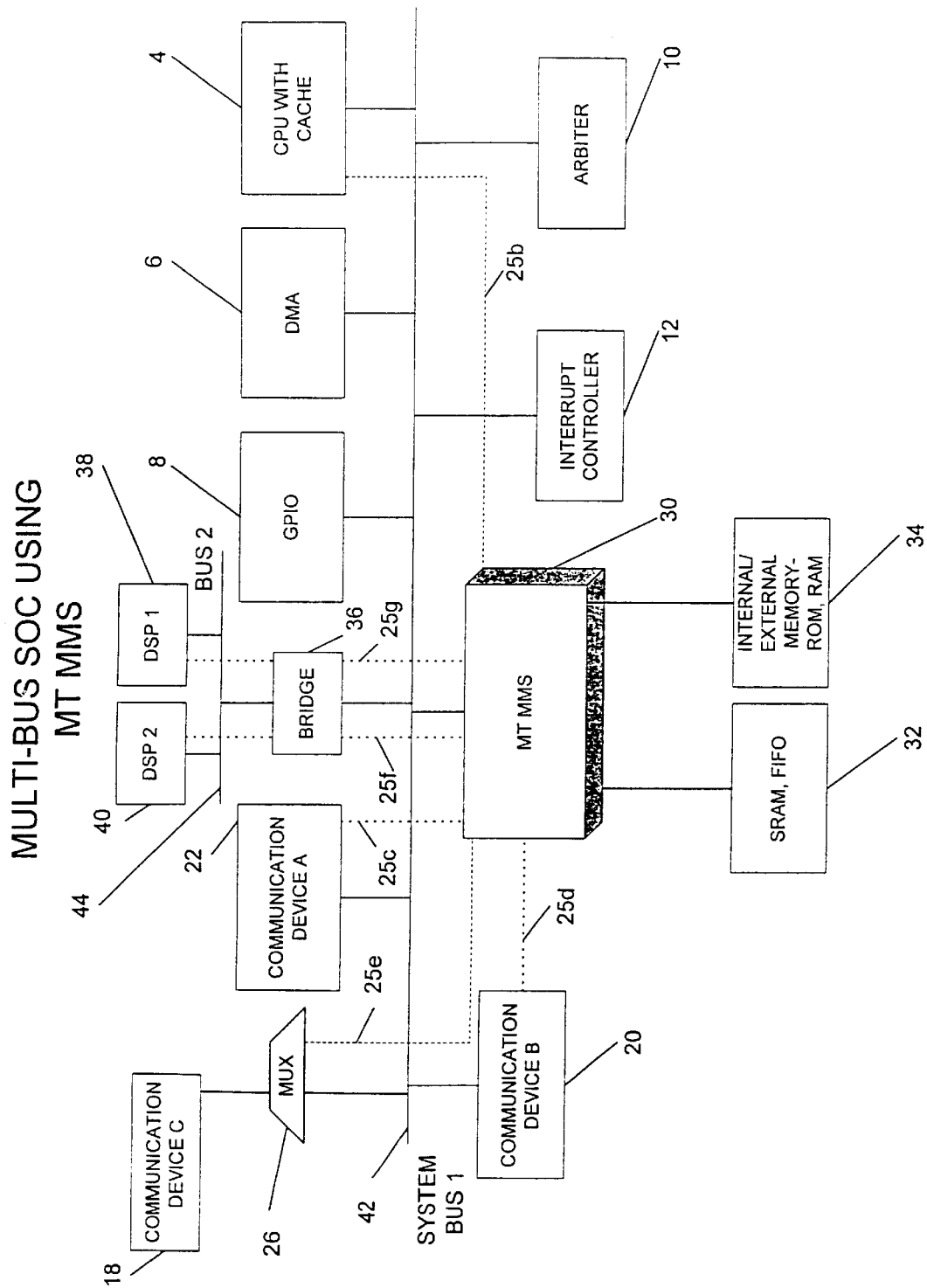
FIG. 3 illustrates a block diagram of an SOC architecture with multiple system buses having a multi-tasking memory management system in accordance with another preferred embodiment of the present invention.

FIG. 3 illustrates a block diagram of an SOC architecture having a multi-tasking memory management system in accordance with a second preferred embodiment of the present invention. This embodiment includes the components of FIG. 2 with the addition of a second system bus 44 working at a different frequency than the first system bus 42 and a bridge 36. Similar to the system bus 24 of FIG. 2, connected to a first system bus 42 of FIG. 3 are the CPU 4, DMA 6, GPIO 8, arbiter 10, interrupt controller 12, communications devices 20, 22, MUX 24 and the MT MMS 30. The second system bus 44 connects other masters such as DSP 1 38 and DSP 2 40 to the MT MMS 30 via the bridge 36 and the first system bus 42. Although not explicitly illustrated in FIG. 3, connected to the second system bus 44 are an arbiter, interrupt controller, DMA, and GPIO. Again, multiple memory buses 25b, 25c, . . . 25n are used to send memory requests to the MT MMS 30 from the CPU 4, communications devices 20, 22, communication device 18 via the MUX 24, DSP 1 38, and DSP 2 40.

Figure 4:
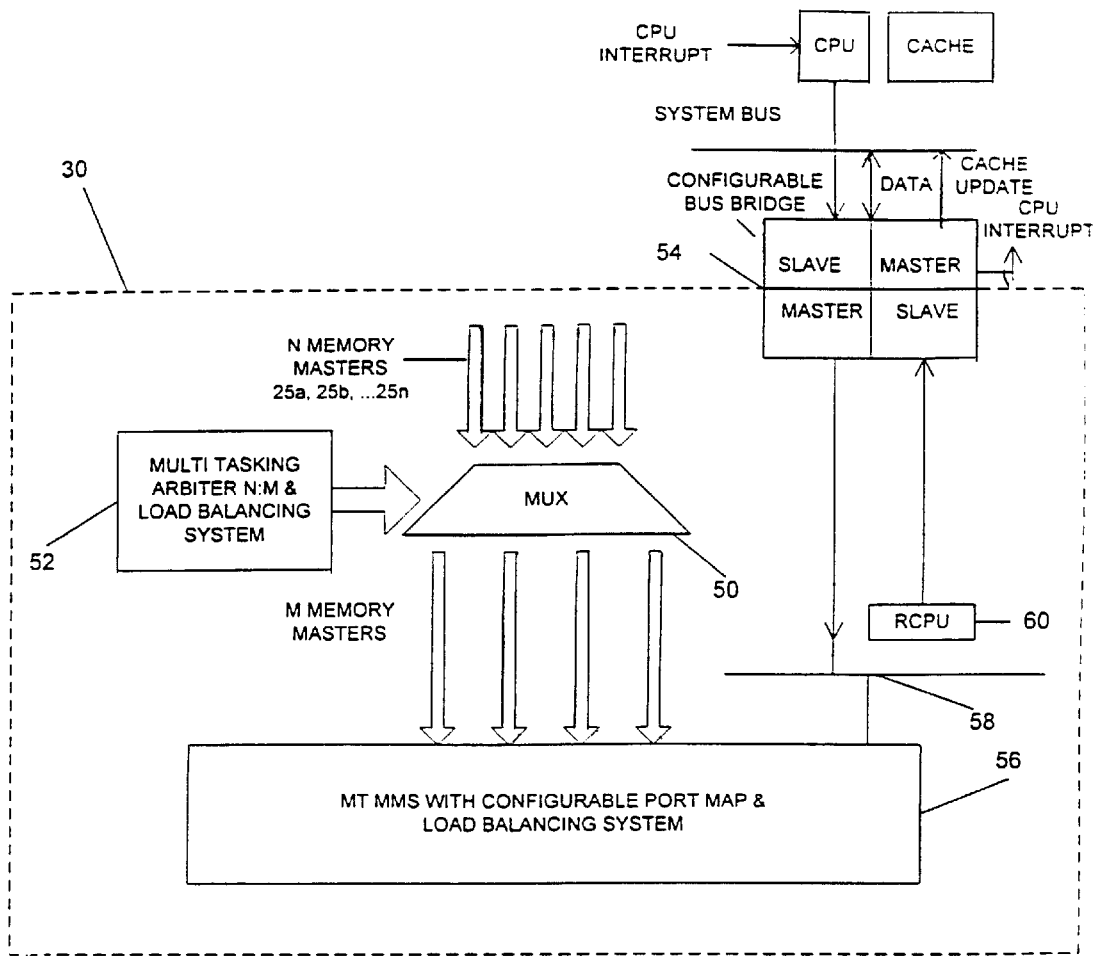
FIG. 4 illustrates an interface between various masters and the multi-tasking memory management system in accordance with the preferred embodiments of the present invention.

FIG. 4 illustrates an interface between various masters and the MT MMS 30 in accordance with the preferred embodiments of the present invention. The MT MMS 30 of the present invention has many advantages and benefits over prior art systems. The MT MMS 30 is a software configurable system having a routing CPU (RCPU) and flexible master interface (IF). As mentioned above, the MT MMS 30 can simultaneously process memory requests from multiple masters during the same clock cycle. By doing so, each master believes that it is accessing a separate and unshared memory bank. This is achieved by multi-tasking, interleaving burst requests of several masters and predictive data access into low latency SRAM buffers. A configurable bus bridge 54 allows the MT MMS 30 to interface with multiple synchronous and asynchronous masters, and system buses.

The MT MMS 30 also maintains data coherency between the multiple masters by operating in posted write and speculative read modes. For example, referring back to FIG. 2, both DSP 2 and CPU 4 may simultaneously send read requests to the MT MMS 30 for the same memory address via memory buses 25a, 25b. Using the multi-tasking function of the present invention, the MT MMS 30 can process both requests simultaneously. In another example, the DSP 2 may write to a memory address while the CPU 4 requests a read from that same address. The MT MMS 30 is capable of informing the CPU 4 of the DSP 2 write request in order to maintain data coherency using an RCPU 60 and a configurable bus bridge 54. In other words, after the DSP 2 has requested a write to a particular address, other masters in the system may read the new data from the same address to update their cache. This is accomplished by the RCPU 60 issuing interrupts to the appropriate masters to DMA their cache from SRAM buffers. An example of the RCPU 60 is a 32 bit RISC processor.

The MT MMS 30 allows SOC users to modify the system without needing to rebuild it from scratch. For example, when a new master and/or new memory is invented or a different type of memory is to be added to the SOC product, the SOC user can adapt the SOC product to interface with the newly added memory by configuring the MT MMS 30, in particular, the RCPU. This approach allows the SOC user to incrementally modify the existing architecture and design with minimal effort and resources.

The MT MMS 30 can also boot up several masters from the same memory space, as described in more detail later herein. In addition, the MT MMS 20 can selectively boot up only certain masters. For example, in a certain SOC architecture there may be many masters embedded therein for which the user will only desire to use, for example, one master. Then, instead of having to redesign and rebuild the entire SOC, the user can configure the MT MMS 30 to only boot up the one master, as described in more detail later herein. The other masters can be left in a "sleep" mode so that newly configured SOC is operating with only one master. Using this method, it will save the user considerable time and resources, and makes the system adaptable to various operational modes.

The MT MMS 30 can be software configured to provide the optimal performance for the SOC product. For example, parameters are configurable by writing various configuration registers such as parity check enable/disable and memory region write protect. Beginning and ending addresses of memory banks can further be configured using software, so as to translate virtual addresses to new physical addresses. This provides a configurable memory map per each ASIC that includes the MT-MMS 30. Also, when the number of masters is changed, the memory map can be modified accordingly.

The MT MMS 30 can provide a configurable number of pipeline stages using SRAM FIFO. This can be either fixed as an RTL parameter or programmed by software. Other parameters that are configurable using the MT MMS of the present invention include configurable mask register that determines which bank stores a particular physical address issued by the master, a configurable bus width for each memory subsystem (e.g., 8, 16, 32, 64 . . . , 1024, 2048 bits), a configurable burst request register, a configurable mode registers for linear and interleaved read, and a configurable cache line read policy per master (e.g., critical word first and zero word first). The MT MMS 30 also supports dynamic programming of mode register in SDRAM (e.g., CAS latency for the SDRAM can be programmed), and provides an integrated micro-controller/CPU that provides programmable self test and system validation stimuli for multimaster transactions, as required in a complex SOC having multiple masters.

Referring back to FIG. 4, the MT MMS 30 includes a MUX 50, a multi-tasking arbiter 52, the configurable bus bridge 54, a configurable port map 56, an interface 58, and the RCPU 60. The multi-tasking arbiter 52 provides the appropriate arbitration, load balancing and scheduling schemes, as described in more detail later herein, to the MUX 50 for selecting the M (e.g., 4) buses/requests from N (e.g., 8) number of buses/requests for any given clock cycle. N represents the number of masters in the overall system and corresponding memory buses/requests that are sent to memory controllers controlled by the MT MMS 30, and M represents the number of selected buses/requests from the MUX 50 at one given clock cycle. The non-selected requests from the given clock cycle waits until the next clock cycle before entering an input request buffer. The M number of requests are processed simultaneously along with the request from the system bus that is connected to the configurable bus bridge 54. Thus, there are M+1 number of simultaneous requests inputted to the configurable port map 56 for an SOC with a single system bus. Each bus inputted to the configurable port map 56, which also provides load balancing, includes data, address, and control lines, but for simplicity, FIG. 4 illustrates only one line per request.

The configurable bus bridge 54 is positioned between the system bus, the interface 58, and the RCPU 60. The configurable bus bridge 54 allows different width and speed input connections to the memory masters, which are residing on one or more system buses. For example, altering the configuration of registers may change the input bus width and the handshake signals. The width of the bus is determined at the system design phase.

The MT MMS 30 is capable of handling the read and write transactions from the masters and through the configurable memory bus bridge 54. Flush commands transmitted via the bus bridge 54 can result in earlier write requests, which are posted before the read requests are completed. This results because write and read requests from four masters to the memory bus can occur concurrently. Further, posted write and delayed read requests can also occur concurrently. Detailed scheduling constraints between masters addressing the same memory space can be programmed using software.

The configurable bus bridge 54 also is used to allow the RCPU 60 to switch from having master role to a slave role and from a slave role to a master role as it relates to the system bus. The ability to switch such a master/slave role of the RCPU is believed to be non-existent in conventional memory management systems. The MT MMS 30 can act as a master of the M+1 connections simultaneously.

Figure 5A:
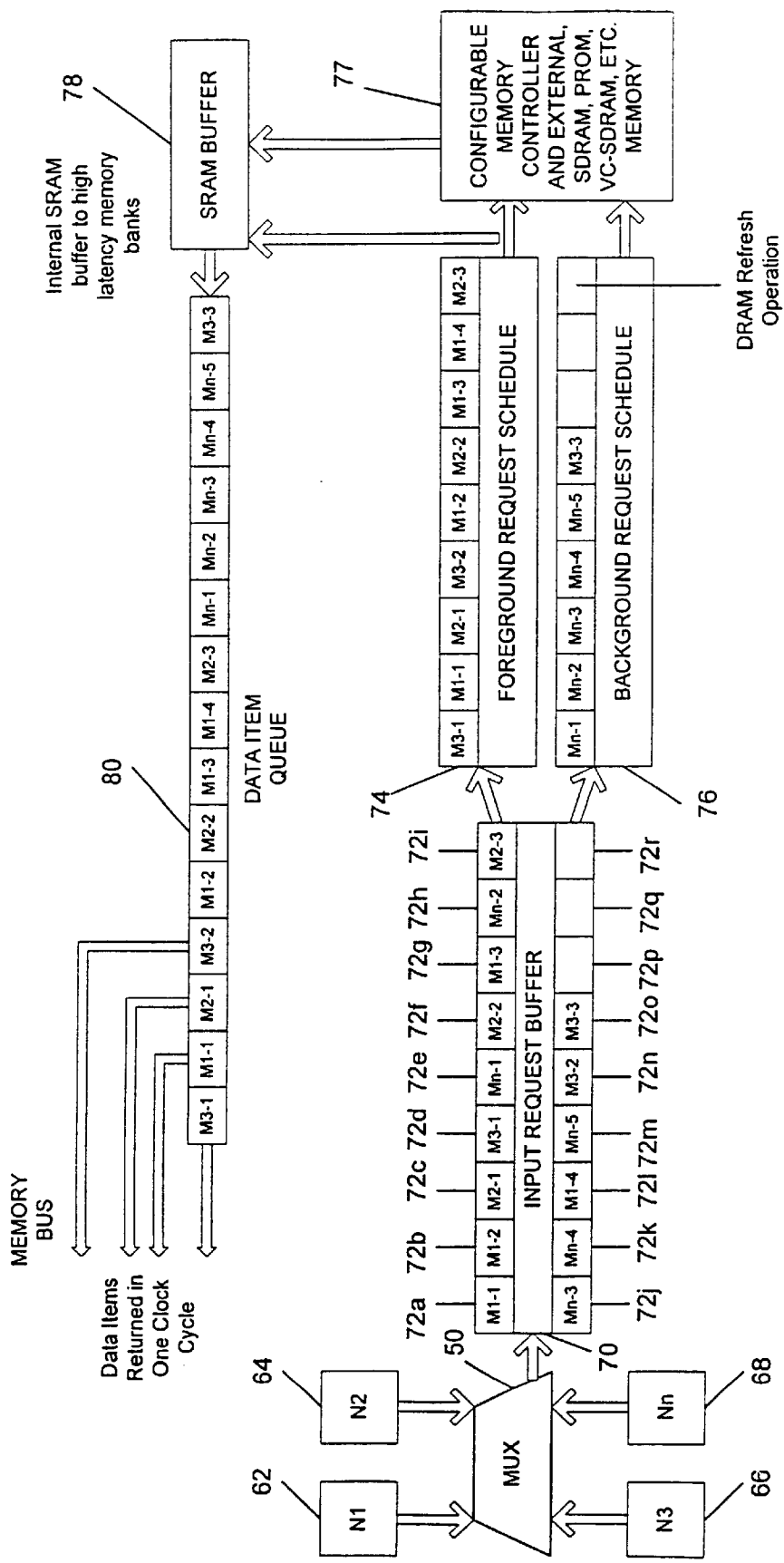
FIG. 5A illustrates an example of an arbitration load balancing and scheduling scheme in accordance with the preferred embodiments of the present invention.

FIG. 5A illustrates an example of an arbitration load balancing and scheduling scheme of the present invention. Configurable arbitration and priority schemes may include round robin, priority, psuedo-random, or fixed bandwidth assignment per master and are preprogrammed using software to be implemented through high speed logic that is connected to the software programmable control/scheduling registers. In the example provided herein, there are n number of masters requesting access to memory. Masters N1 62, N2 64, N3 66, and Nn 68 via their memory buses send the memory requests to the MUX 50. The MUX 50 selects M number of masters for a given clock cycle and outputs the memory requests to an input request buffer 70 based on the order that the requests are received from the various selected M masters. For example, the request buffer 70 first buffers the first request received from any of the selected M masters. In this case, the first request from the first master M1-1 (request 1) is first buffered in slot 72*a*. The next request received by the request buffer 70 via MUX 50 is also from the first master, M1-2 (request 2), which is buffered in the second slot 72*b*. The third request outputted by the MUX 50 to the request buffer 70 is from the second master, M2-1 (first request), which is buffered in the third slot 72*c*. The fourth request is from the third master, M3-1 (first request), which is buffered in the fourth slot 72*d*. This buffering scheme continues for each request received by the MUX 50 from the selected M masters.

The requests in the request buffer 70 are next separated into foreground (real time) requests and background requests. The foreground requests take higher priority over the background requests since such requests are more important and critical to the masters, and may be available with zero latency. For example, the foreground requests may be residing in the memory (SRAM) buffer(s) 78 (e.g., one per controller) so they can be retrieved with zero latency. Each memory access controller will preferably have one channel to access on-chip SSRAM and another channel to access external memory. The background requests, on the other hand, have lower priority because these requests may not be residing in the memory (SRAM) buffer or may be DRAM refresh operation. The latency of each memory bank is known to the RCPU and programmed into the specific control register. The background requests also include DRAM refresh and updating the on-chip SRAM buffer using data from external memory. The SRAM buffer is implemented by synchronous static RAM that is generated by a memory compiler for the specific process technology (e.g., Artisan memory compiler).

The foreground and background requests are separated into the foreground request schedule 74 and background request schedule 76, preferably in sequence. For example, in the foreground request schedule 74, foreground requests may be placed in the order received by the input request buffer 70 depending on the priority assigned to various masters and when no conflicts exist at the destination memory bank. In other embodiments, the foreground and background requests are placed in the foreground and background request schedules 74, 76 in the order preprogrammed by the software. The following requests are assumed to be foreground requests and are placed in the foreground request schedule 74 in the following order: M3-1 (slot 72*d* of the request buffer 70), M1-1 (slot 72*a*), M2-1 (slot 72*c*), M3-2 (slot 72*n*), M1-2 (slot 72*b*), M2-2 (slot 72*f*), M1-3 (slot 72*g*), M1-4 (slot 72*l*), and M2-3 (slot 72*i*). Alternatively, in the background request schedule 76, the following requests are assumed to be background requests and place in the order received by the input request buffer 70 assuming there is no conflicts at the destination memory bank: Mn-1 (slot 72*e* of the request buffer 70), Mn-2 (slot 72*h*), Mn-3 (slot 72*j*), Mn-4 (slot 72*k*), Mn-5 (slot 72*m*), and M3-3 (slot 72*o*).

After the memory requests are split between the foreground and background request schedules 74, 76, a memory controller block 77 and the SRAM buffer 78 are used to process the memory requests. The foreground requests are first queued in the data item queue 80 followed by the background requests. Thus, the sequence in the data item queue 80 is as follows: the foreground requests M3-1, M1-1, M2-1, M3-2, M1-2, M2-2, M1-3, M1-4, and M2-3 followed by the background requests Mn-1, Mn-2, Mn-3, Mn-4, Mn-5, and M3-3. In the example provided herein, it is assumed that four memory requests are processed simultaneous using four memory controllers that are residing in the memory controller block 77. Thus, the first four requests M3-1, M1-1, M2-1, and M3-2 are processed simultaneously via the memory bus to several memory banks. In other embodiments, the MT MMS can process more or less than four requests simultaneously.

The MT MMS 30 supports error reporting such as global and local errors. Local errors are associated with one or several transactions and are reported to the requesting master. Global errors such as reboot, reset, and the like are reported to all masters. Both types of errors are reported via interrupt mechanism or by writing in the MT MMS core status registers. The MT MMS 30 includes its own status registers to allow other masters to read asynchronously. Also, if there is an urgent error, the MT MMS 30 will promptly notify the other masters. Examples of the errors include parity error, fatal error interrupt, timeout error, and the like.

The RCPU residing in the MT MMS 30 notifies the other masters of repairs that are required due to an error. The RCPU can also shut down access to certain sections of the SOC where there are error/fault conditions or during repair mode (i.e., when the MT MMS reprograms the memory space). In another example, the RCPU can communicate with a virtual CPU (VCPU) residing on a system bus or certain other masters to notify the masters of expected demand overflow conditions that may result because of service delays.

To the application software residing in the VCPU on the system bus, it may appear that the VCPU is the device accessing the memory. However, in real operation, the RCPU assigns the appropriate bus, memory band and address look up table to each request/master. The purpose of the background operation conducted by the RCPU is to prefetch certain data times from external memory and store them in zero latency SRAM so that they are available immediately upon request by the VCPU or other masters.

There are many commands associated with the MT MMS 30 of the present invention. The following is a sample of such commands: memory bank read and write; memory burst read and write; cache line read; posted write; speculative read; configuration register write and read; algorithm instructions to SRAM buffer read; algorithm data tables to SRAM buffer read; CSR register n read; interrupt register read; FIFO flush; and memory write and invalidate. In addition, the MT MMS 30 can send the RCPU various alarm signals/bits, for example, FIFO full at endpoint 1, 2, . . . , n.

Figure 5B:
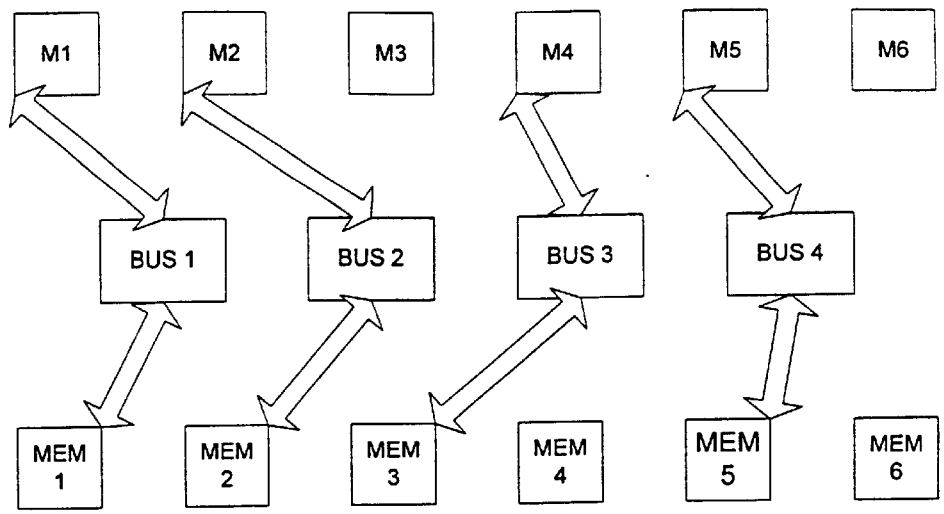
FIG. 5B illustrates another example of an arbitration load balancing and scheduling scheme in accordance with the preferred embodiments of the present invention.

FIG. 5B illustrates another example of an arbitration load balancing and scheduling scheme in accordance with the present invention. This example assumes that there are six masters M1, M2, M3, M4, M5, and M6; four buses BUS1, BUS2, BUS3, and BUS4 (memory threads or inter connections); and six memory banks MEM1, MEM2, MEM3, MEM4, MEM5, and MEM6. In other embodiments there may be more or less masters, buses, and memory banks.

During operation in accordance with the example in FIG. 5B, it is assumed that in the first clock cycle, each master will send memory requests to various memory banks via their various memory buses. For example, M1 will request memory in MEM1, M2 will request memory in MEM2, M3 will request memory in MEM2, M4 will request memory in MEM3, M5 will request memory in MEM5, and M6 will request memory in MEM6. Thus, there will be a total of six memory requests during the first clock cycle. However, using the example provided earlier, this example assumes that only four memory requests can be processed simultaneously based on the architecture of this example (i.e., four buses).

Based on some pre-program-med scheduling and arbitration load balancing scheme, four requests are selected for processing in the next clock cycle per each memory bank. As a result, in the second clock cycle, the following requests are processed: M1 to MEM1; M2 to MEM2; M4 to MEM3; and M5 to MEM5. The block diagram in FIG. 5B further illustrates the requests from the selected masters to the various memory banks. In the meantime, other memory requests are sent from one or more masters during the second clock cycle. For example, in the second clock cycle, M4 will request memory in MEM2.

Next, the two memory requests (M3 to MEM2 and M6 to MEM6) that were not selected for processing in the second clock cycle are now selected and processed during the third clock cycle. In addition, memory request M4 to MEM2 and refresh MEM1 operation are processed during the third clock cycle. This type of scheduling and arbitration load balancing scheme continues for each clock cycle thereafter, thereby enabling the MT MMS of the present invention to processes multiple requests simultaneously.

Figure 6A:
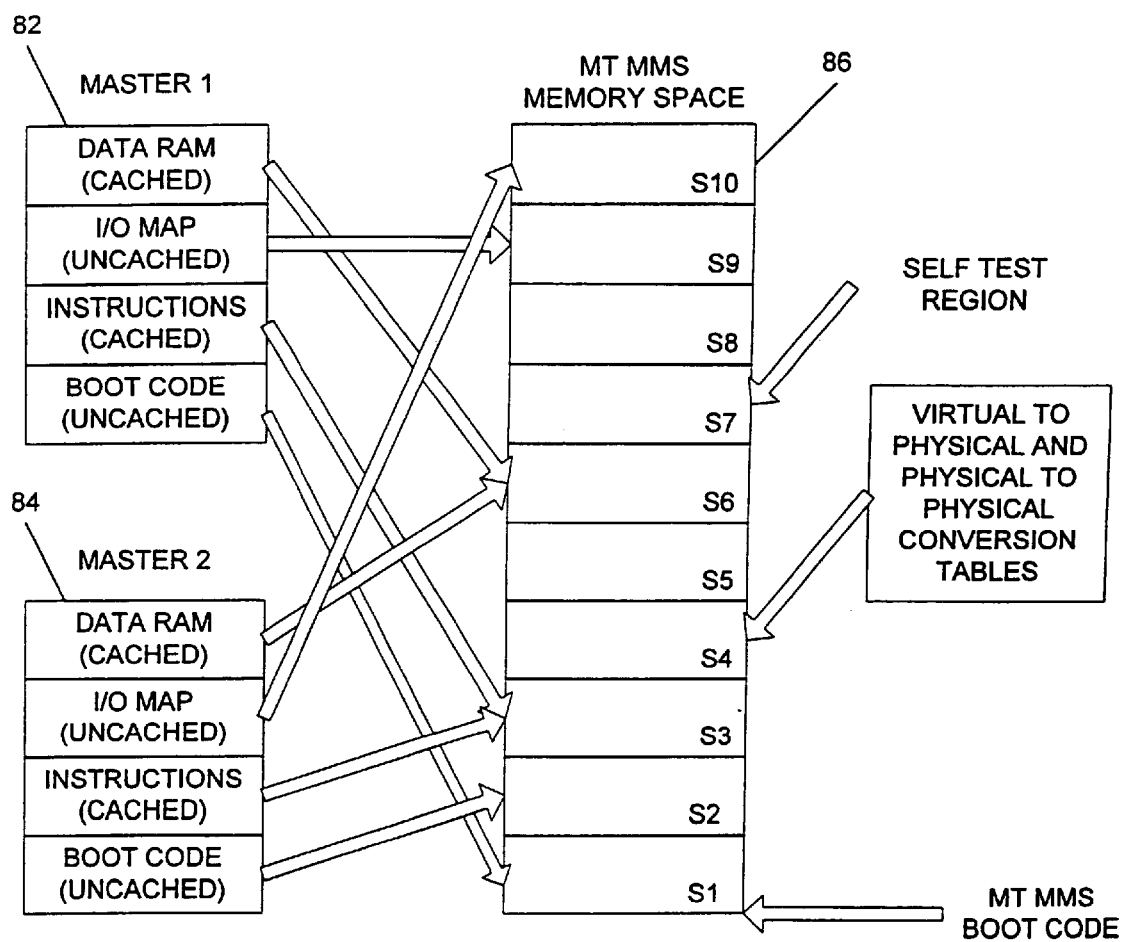
FIG. 6A illustrates an example of memory mapping for two masters on the multi-tasking memory management system memory space in accordance with the preferred embodiments of the present invention.
Figure 6B:
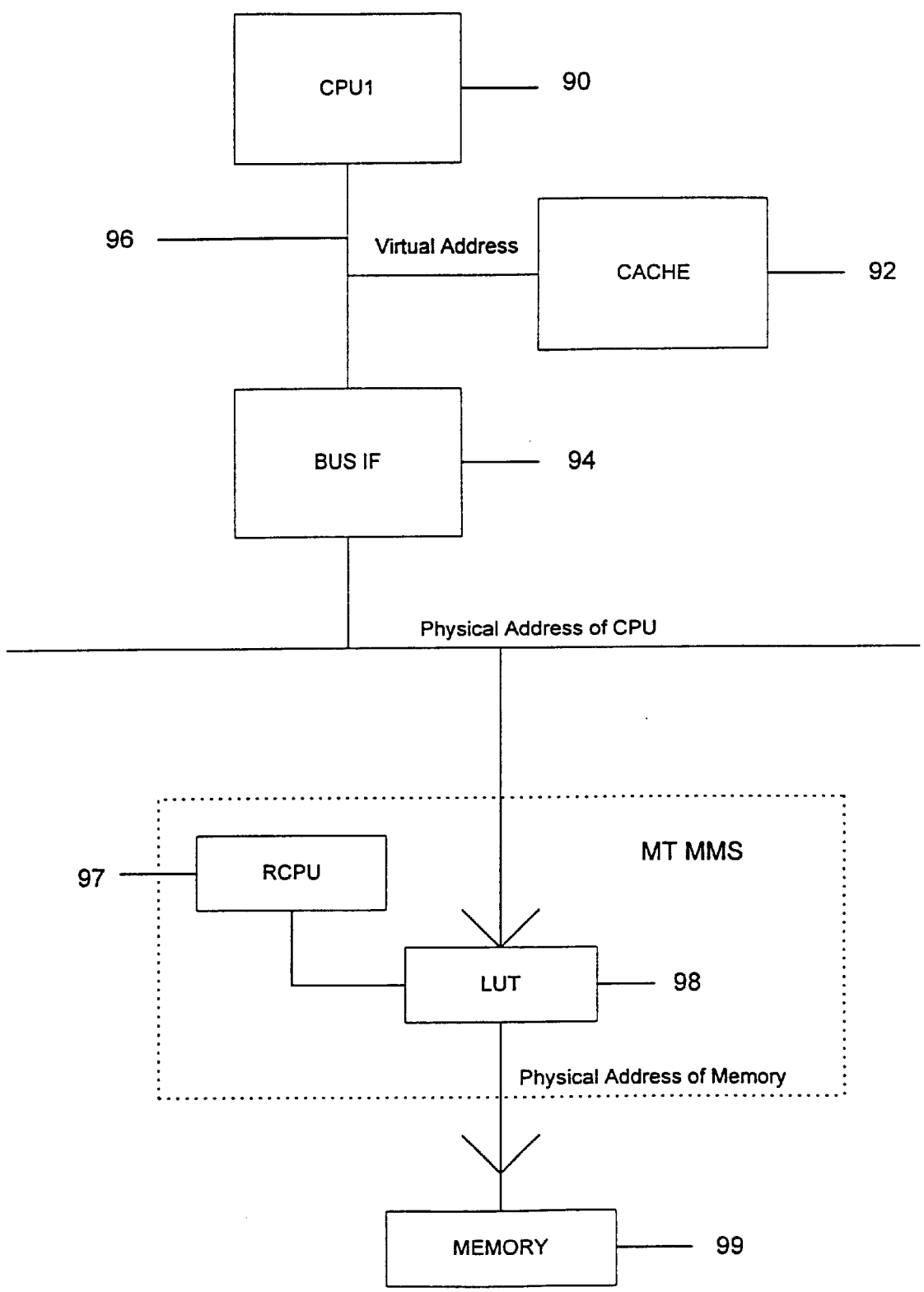
FIG. 6B illustrates a method of converting virtual addresses to physical addresses in accordance with the preferred embodiments of the present invention.

FIGS. 6A and 6B illustrate examples of memory mapping on the MT MMS memory space. The two masters 82, 84 can interleave or overlap data in the MT MMS memory space 86. For simplicity, the MT MMS memory space 86 is assumed to have ten addresses (i.e., 1–10). Certain spaces in the memory space may be only accessible by the RCPU of the MT MMS. Such spaces can be, for example, space S1 for MT MMS boot code, space S4 for virtual to physical and master physical to memory physical address conversion, or space S7 for self test mode.

In certain situations, several masters may use the same memory space to store data, which would provide an overlapping scenario. For example, instructions and data for both masters 82, 84 can be written in spaces S3 and S6, respectively. In this case, assuming that the first master 82 writes to space S6, the MT MMS must notify the second master 84 that first master's data is written in space S6 because this space is also used by second master 84 to read/write data. The MT MMS of the present invention is intelligent enough to notify the other masters when data is written in a shared or overlapped memory space, such as space S3 or S6. In other situations, each master may use a separate piece of data to write to separate spaces on the memory space 86, which would provide an interleaving scenario. The RCPU will generate the interrupts to notify Master 2 84 that data update is available in a buffer after Master 1 82 has written to a particular space in the MT MMS memory space 86. The RCPU keeps a log of previous master memory requests and updates them in the shared memory space.

FIG. 6B illustrates a diagram of converting virtual addresses to physical addressing in accordance with the preferred embodiments of the present invention. The CPU1 90 may have a virtual/logical address inside its cache 92. The CPU1 90, cache 92, and a CPU1 bus IF 94 (cache controller) are connected to each other via a cache bus 96. The bus IF 94 converts the virtual address into a physical address for CPU 1 90. The converted physical address of the CPU 1 90 is then converted by the RCPU 97 using a LUT (look up table) 98 to an actual physical address used to store the data in memory 99.

Figure 7:
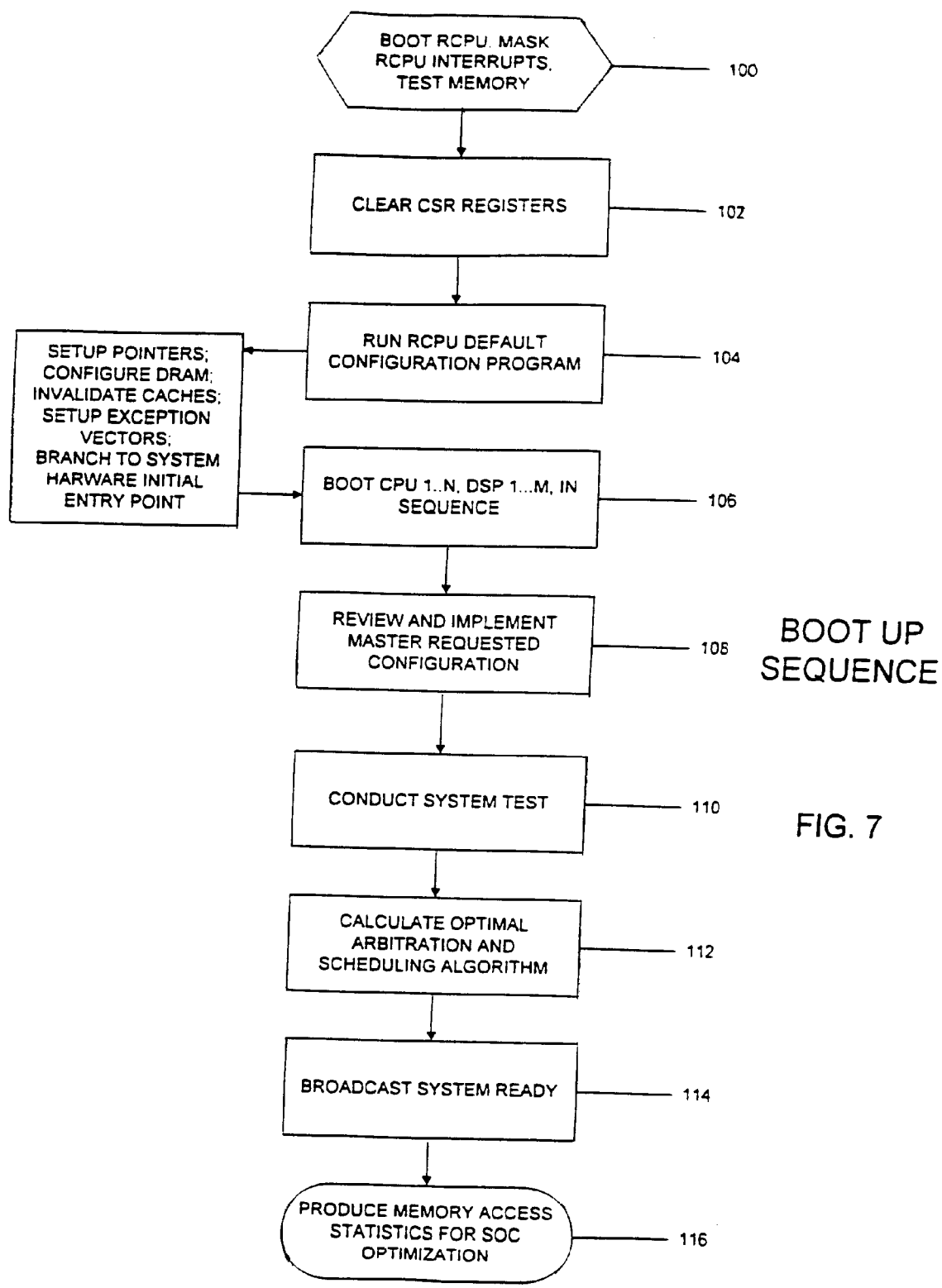
FIG. 7 illustrates a flow chart of a boot-up sequence in accordance with the preferred embodiments of the present invention.

FIG. 7 illustrates a flow chart of a boot-up sequence in accordance with the preferred embodiments of the present invention. In the first step 100, the RCPU of the MT MMS 30 is booted up along with masking the RCPU interrupts and testing the system memory. Next, the MT MMS 30 clears the control and status registers (CSR) in step 102. Thereafter, the MT MMS 30 runs the RCPU default configuration program in step 104. These steps include testing internal memory and loading memory configuration. The default configuration program allows the overall system to setup pointers, configure DRAM, invalidate caches, setup exception vectors, and branch to system hardware initial entry point.

After running the RCPU default configuration program, each master such as CPU 1 . . . N, DSP 1 . . . M, etc. is booted up in sequence in step 106. Once the masters are booted up, the MT MMS 30 reviews and implements master requested configurations in step 108 such as loading TCP/IP stack in the CPU 4 as well as DSP protocol in DSP memory, and configuring all peripherals, etc. The MT MMS 30 then conducts system test in step 110 and calculates optimal arbitration load balancing and scheduling in step 112. Thereafter, the MT MMS 30 notifies/broadcasts the masters that the SOC system is ready in step 114. Finally, in step 116, the MT MMS 30 produces memory access statistics for SOC optimization.

Figure 8:
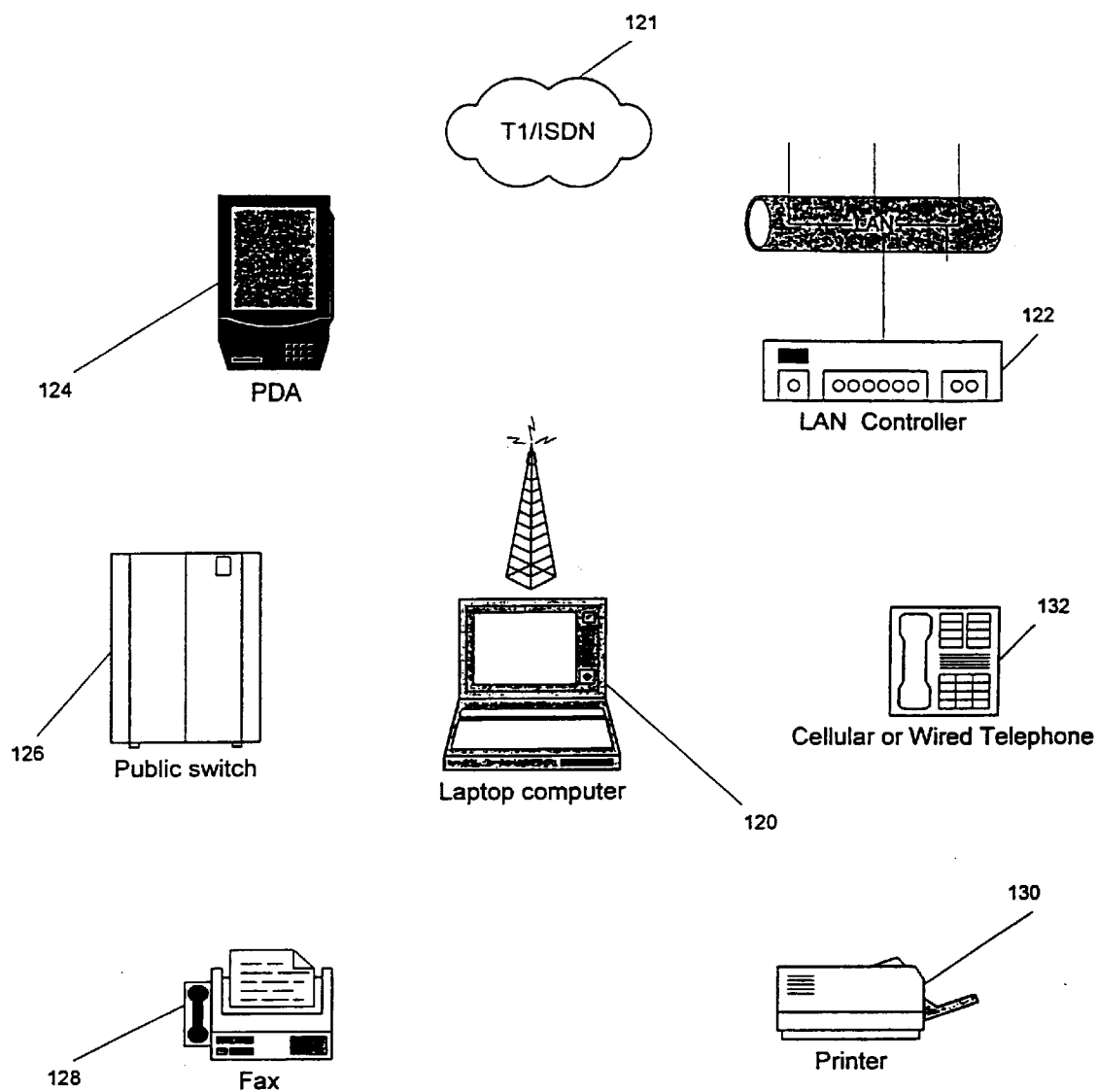
FIG. 8 illustrates a computer device that is capable of establishing communication links with a number of peripheral devices in accordance with the present invention.
Figure 9:
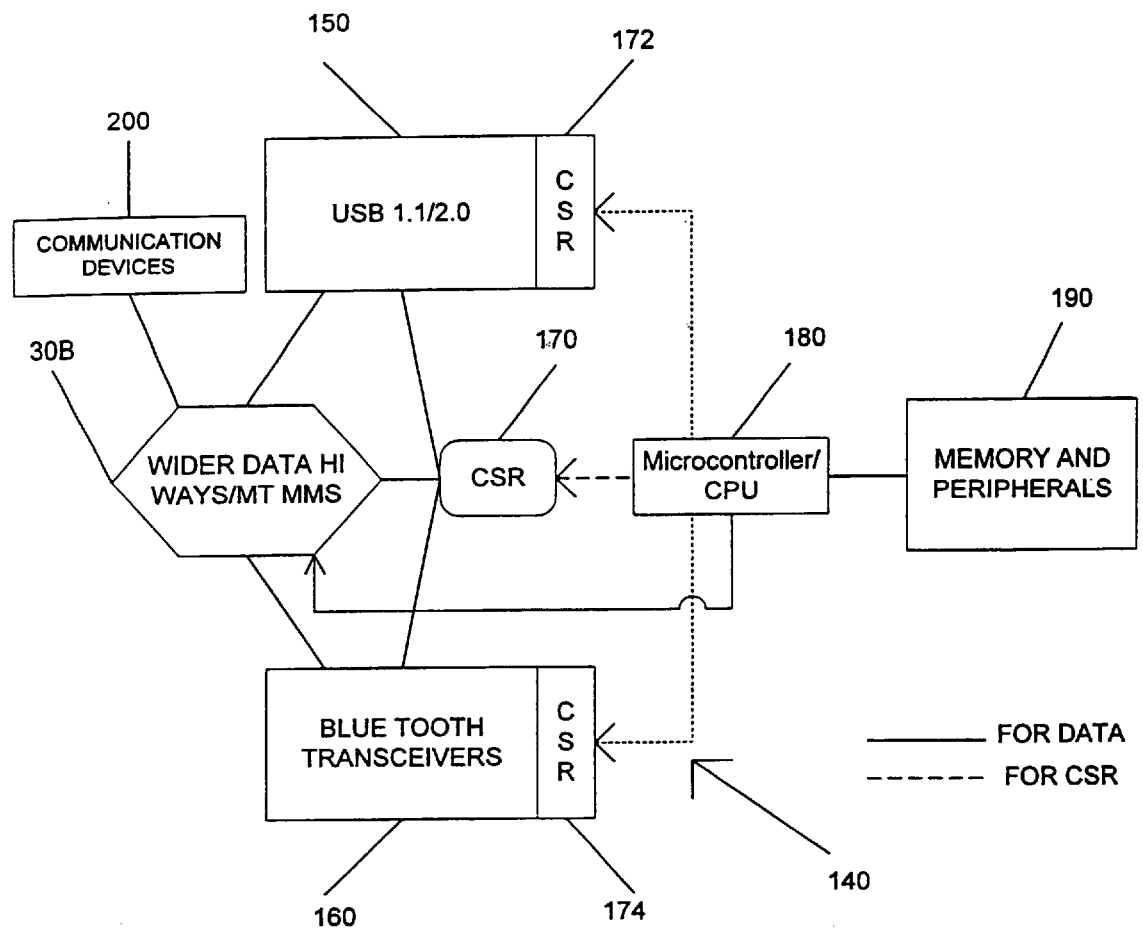
FIG. 9 illustrates a block diagram of a stream switched device in accordance with another embodiment of the present invention.
Figure 10:
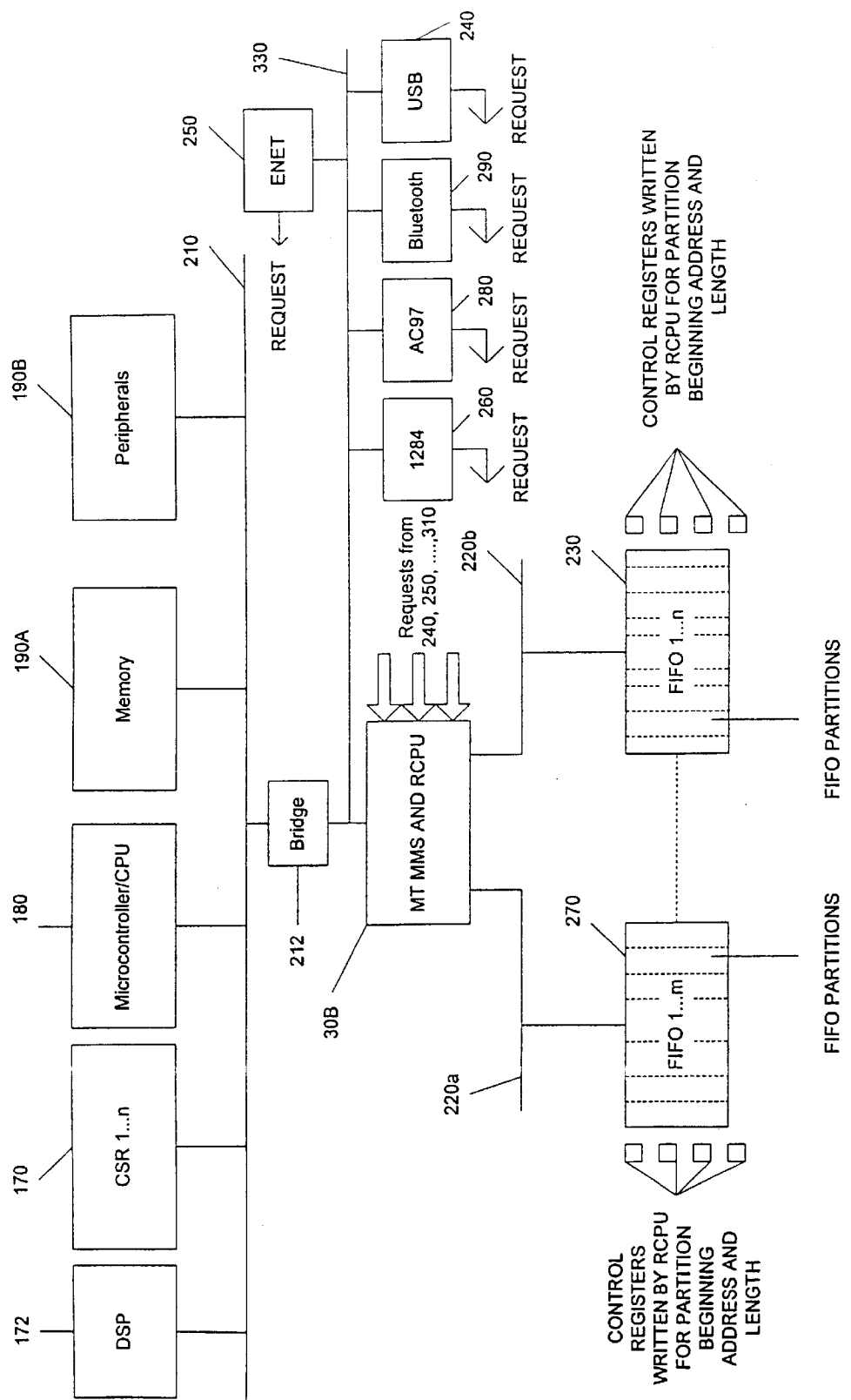
FIG. 10 illustrates a more detailed diagram of the stream switched device of FIG. 9 in accordance with the present invention.

The MT MMS of the present invention can be implemented in many different technologies and products such as wireless, VoIP (voice over IP), MoIP (media over IP), and the like. For example, in one embodiment of the present invention, the MT MMS can be used with "Bluetooth" technology as illustrated in FIGS. 8–10. Bluetooth is a technology specification, which is intended to become a worldwide standard for small form factor, low-cost, short range radio links between mobile PCs, mobile phones, pagers, personal digital assistants (PDAs) and similar devices. It is capable of handling both voice and data and is intended as a short range cable replacement between such devices. As described in the *Specification of the Bluetooth System*, vols. 1 and 2 (incorporated herein by reference) available on the World Wide Web at http://www.bluetooth.com, potential applications include PC to PC communication, data exchange between mobile PCs and cellular phones, time and calendar synchronization, remote networking, PC and peripheral communication, home automation and the like.

In FIG. 8, a computer 120 such as a notebook computer may be able to establish Bluetooth communication links with a number of peripherals or associated devices such as a T1/ISDN line 121, LAN controller 122, a PDA 124, a public switched telephone network (PSTN) 126, a fax machine 128, a printer 130 and a cellular/wired phone 132. Some of these links, such as the link to the PDA 124, may place relatively low demands on the computer 120 in terms of data transmission speed and volume, control signal requirements and the like. Others, however, such as the T1/ISDN line 121, LAN controller 122 or the cellular/wired phone 132, may represent a relatively high data and control signal load on the computer 120. When the computer 120 is required to support several peripherals simultaneously, e.g., receiving a fax via fax machine 128 while maintaining a LAN connection via LAN controller 122 and an Internet connection via cellular/wired telephone 132, the volume and speed of data and control signals collectively required by the peripherals may overload or choke the bus of the computer 120.

This problem is solved by providing a stream switched device that acts as an interface and performs communication tasks between the computer 120 and the peripheral devices as described above. The stream switched device includes a Bluetooth transceiver for communicating with the peripherals and an I/O interface for communicating with the computer 120.

A block diagram of the stream switched device 140 is shown in FIG. 9. As shown therein, the stream switched device 140 includes a USB interface 150 for communicating with a computer. Preferably, the USB interface conforms to the USB 1.1 specification and is capable of processing data at 12 Mbps; even more preferably, the USB interface corresponds to the USB 2.0 specification when it is adopted and is capable of processing data at 480 Mbps or more.

Also included in the stream switched device 140 are one or more Bluetooth transceivers 160 for communicating with the peripherals according to the Bluetooth specification. The Bluetooth transceivers 160 communicate with the USB interface 150 via a combination or parallel data streams over several 32 bit or wider data highways/MT MMS 30B as described in greater detail herein above. Other communication devices/cores 200 are also connected to the wider data highway/MT MMS 30B.

Each of the USB interface 150, Bluetooth transceivers 160 and data highway/MT MMS 30b can communicate with a set of control status registers 170. The control status registers 170, 172, 174 are also accessible by a microcontroller 180 such as the 8051 microcontroller or a 32 bit RISC CPU such as the Lexra LX 4180 CPU and equivalents manufactured by Intel Corporation and other companies. The microcontroller 180 in turn is connected to a memory and the peripherals 190 and the wider data highways/MT MMS 30B, as will be described in greater detail below.

FIG. 10 shows the makeup of a stream switched device in greater detail. The stream switched device is characterized by various buses, a narrow 8 or 32 bit system bus 210 and several wide 32 bit buses 220a, 220b and 330, to facilitate the exchange of data between a computer and the peripherals. The microcontroller 180, memory 190A and peripherals 190B are connected to the 8 or 32 bit bus 210, as are the control status registers 170 of the various peripheral cores, a DSP 172, and the MT MMS 30B via a bridge 212. The MT MMS 30B is also connected to the wide buses 220a, 220b, and peripheral bus 300. More specifically, in this example, the MT MMS 30B is connected to two or more 32 bit wide FIFOs 230 and 270, which handle communication between the MT MMS 30B and the Bluetooth transceivers and peripherals that are connected to the peripheral bus 330. Also effectively coupled (not shown) to the FIFOs 230 are the USB-UDC 240, ENET 250, and 1284 printer interface 260. FIFO 270 is further effectively coupled to AC 97 280, and Bluetooth 290. These effective connections are dynamic effective connections and can be rerouted by the RCPU to optimize the system operation and throughput.

FIG. 10 is illustrated in order to emphasize that the MT MMS 30B is an autonomous memory management system from the main or VCPU 180 and processes memory requests independently of the VCPU 180. The VCPU 180 performs system/application tasks while the RCPU in the MT MMS 30B simultaneously performs memory management tasks. Thus, there exist at least two autonomous systems in the overall SOC architecture. As known, one CPU would not have sufficient cycles at frequencies below, for example, 200 MHz to handle packet level interrupts from several communication cores. Each interrupt generally requires 40–200 cycles to store CPU pipeline content, process the interrupt handler and/or load the appropriate register contents.

Each of the FIFOs 230, 270 are partitioned by software into blocks (shown by dashed lines) and corresponding control registers are written into by the RCPU for partitioning beginning address and length. In one of the FIFOs 230, 270, each peripheral device on the bus 330 is given a block of space. In these blocks, each peripheral device can store two or three packets (i.e., beginning addresses for packets 1, 2, 3, ...). In the RCPU, there is also a routing table (similar to a network routing table) for connecting/switching peripherals on the bus 330. For example, the USB 240 may write to a certain section in memory and make the 1284 printer interface 260 read from the same section. Thus, the USB 240 will write and the 1284 printer interface 260 will read from the same space in the memory using the routing table of the RCPU. During this step, the RCPU in the MT MMS 30B autonomously performs such routing tasks without involving the main or VCPU 180. In this example, the VCPU 180 may perform tasks requested by the DSP 172 via the common registers 170 without having to concern itself with lower level memory switching tasks since the MT MMS 30B and the RCPU can perform such memory switching tasks. The MT MMS has the state machines required for parallel hi-speed data streaming.

The RCPU in the MT MMS 30B also includes a set of registers for each peripheral on the bus 330. The registers may include information such as beginning/end address, size of block, number of packets, pointer for packet completion, status word, etc. This information is written by the RCPU based on the required system configuration.

Figure 11:
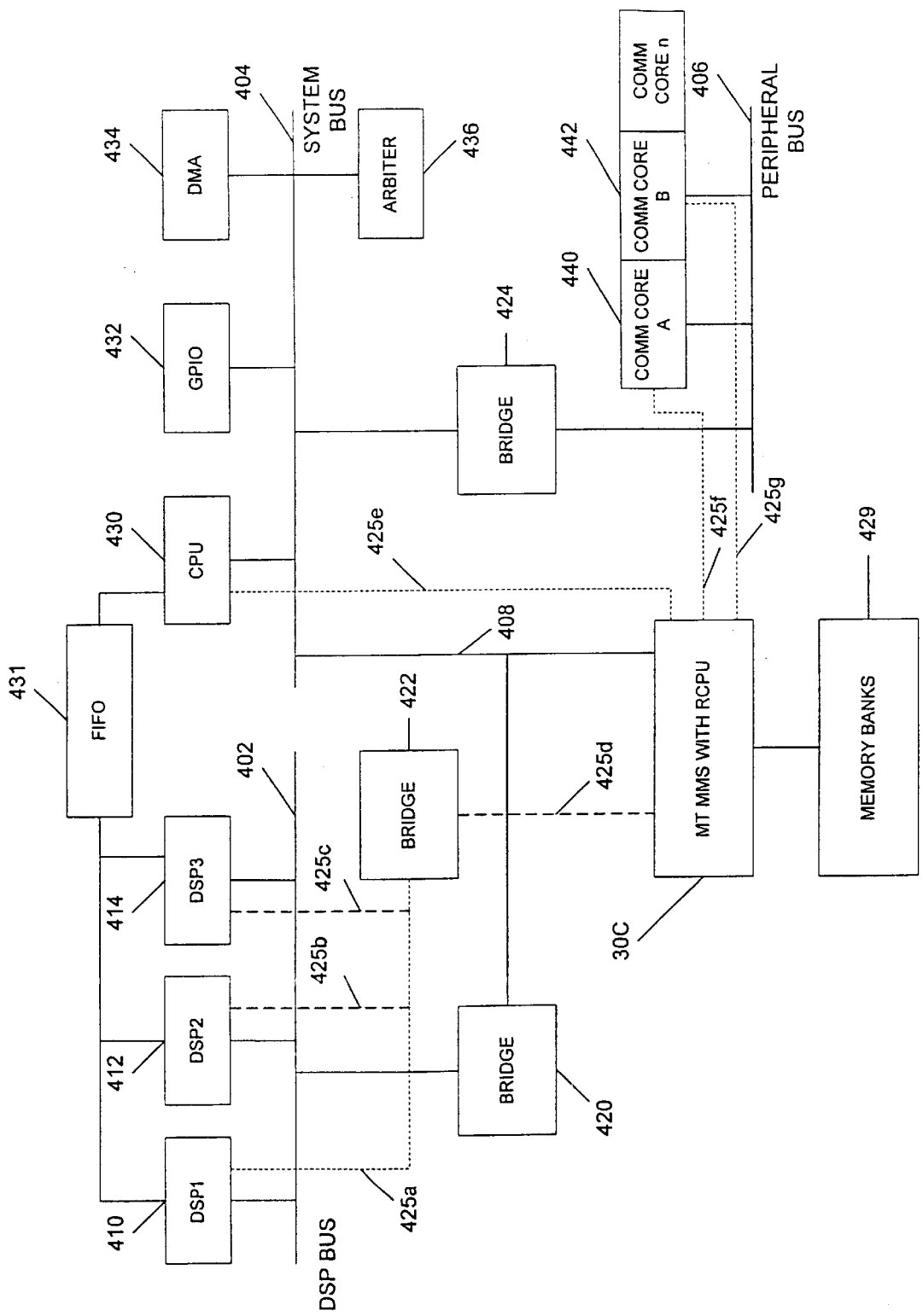
FIG. 11 illustrates a block diagram of an example of a multiple DSP core VoIP (voice over IP) application using the multi-tasking memory management system of the present invention.

FIG. 11 illustrates a block diagram of an example of a VoIP (voice over IP) application using the MT MMS of the present invention. As described in more detail hereinafter, the MT MMS of the present invention can be implemented in an application using VoIP or MoIP (media over IP) technology. In this example, there are three DSPs, one CPU (or virtual CPU), and multiple communication cores/devices. One DSP may be used for image compression, the second DSP array for voice compression, and the third for 3D graphics. The three DSPs 410, 412, 414 are connected to a DSP bus 402, which is further connected to the MT MMS 30C via a bridge 420. Each DSP 410, 412, and 414 is further connected to the MT MMS 30C via its dedicated memory bus 425a, 425b, 426c, 425d (dashed lines) through another bridge 422. A FIFO 431 is further connected between the CPU 430 and the DSP1 410, DSP2 412, and DSP3 414 as known in the art. Although the FIFO 431 is illustrated as a single FIFO, it is understood that a separate FIFO is connected between each DSP and CPU 430.

Connected to a system bus 404 are the CPU 430, GPIO 432, DMA 434, and Arbiter 436, as described earlier herein. The system bus 404 is further connected to the MT MMS 30C via Bus 408 and to the DSP bus 402 using the bridge 420. Again, the CPU 430 can use a dedicated memory bus 425e for sending memory requests to the MT MMS 30C. The MT MMS 30C is used to access the various memory banks 429.

There is also another peripheral bus associated with the example shown in FIG. 11. A peripheral bus connects various communication cores/devices 440, 442, etc., to the system bus 404 via a third bridge 424. The communication cores/devices 440, 442, etc. can further use dedicated memory buses 425f, 425g, etc. to send memory requests directly to the MT MMS 30C without having to use the system bus 404.

FIGS. 12A–12D illustrate the application of the multitasking management memory system of the present invention for switching data in an optical network, WDM or Sonet ports having higher data rate capabilities, and optical transmissions of the data are converted by a transceiver to electronic format. For example, it is known that the data rate for the USB 1.1 is about 12 Mbps, the rate for the USB 2.0 is about 480 Mbps, the rate for the Sonet is 2.5 Gbps, and the rate for one WDM fiber (wave division multiplex) is about 10 Gbps.

Figure 12A:
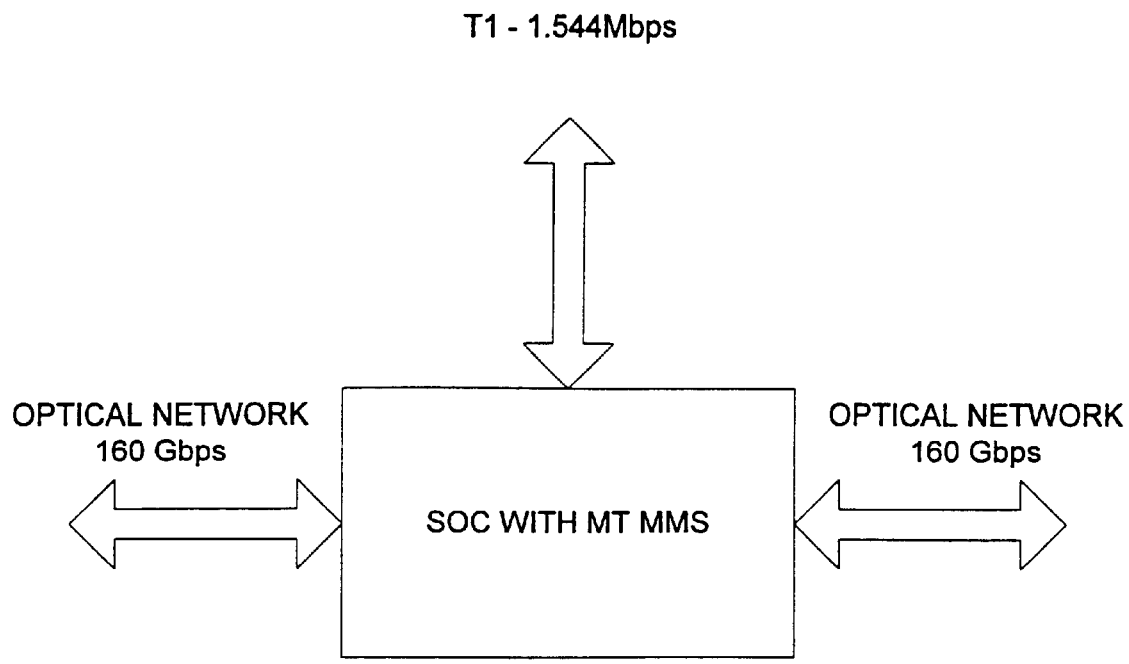
FIGS. 12A–12D illustrate an application for optical switching using the multi-tasking management memory system of the present invention.
Figure 12B:
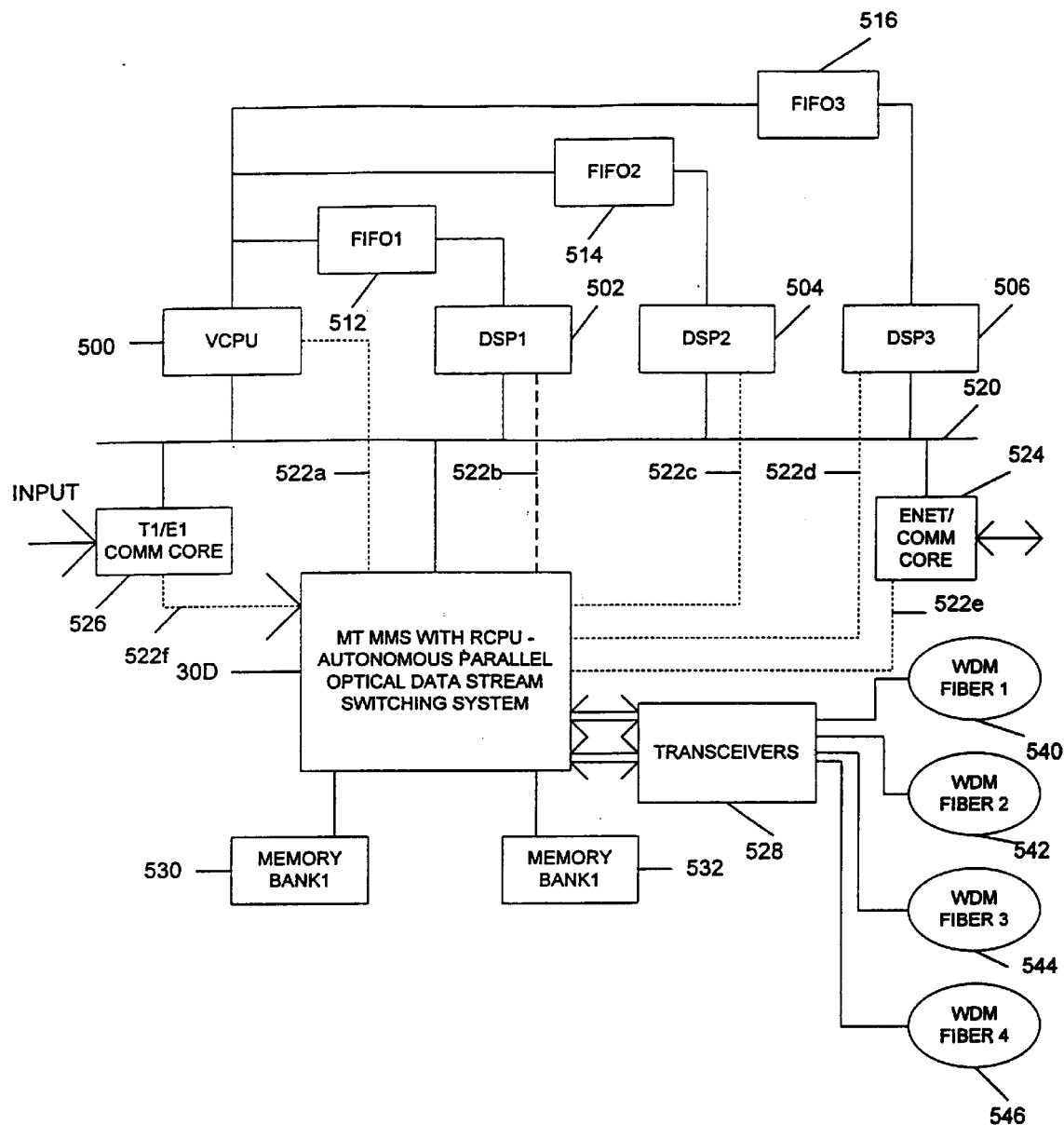
Figure 12C:
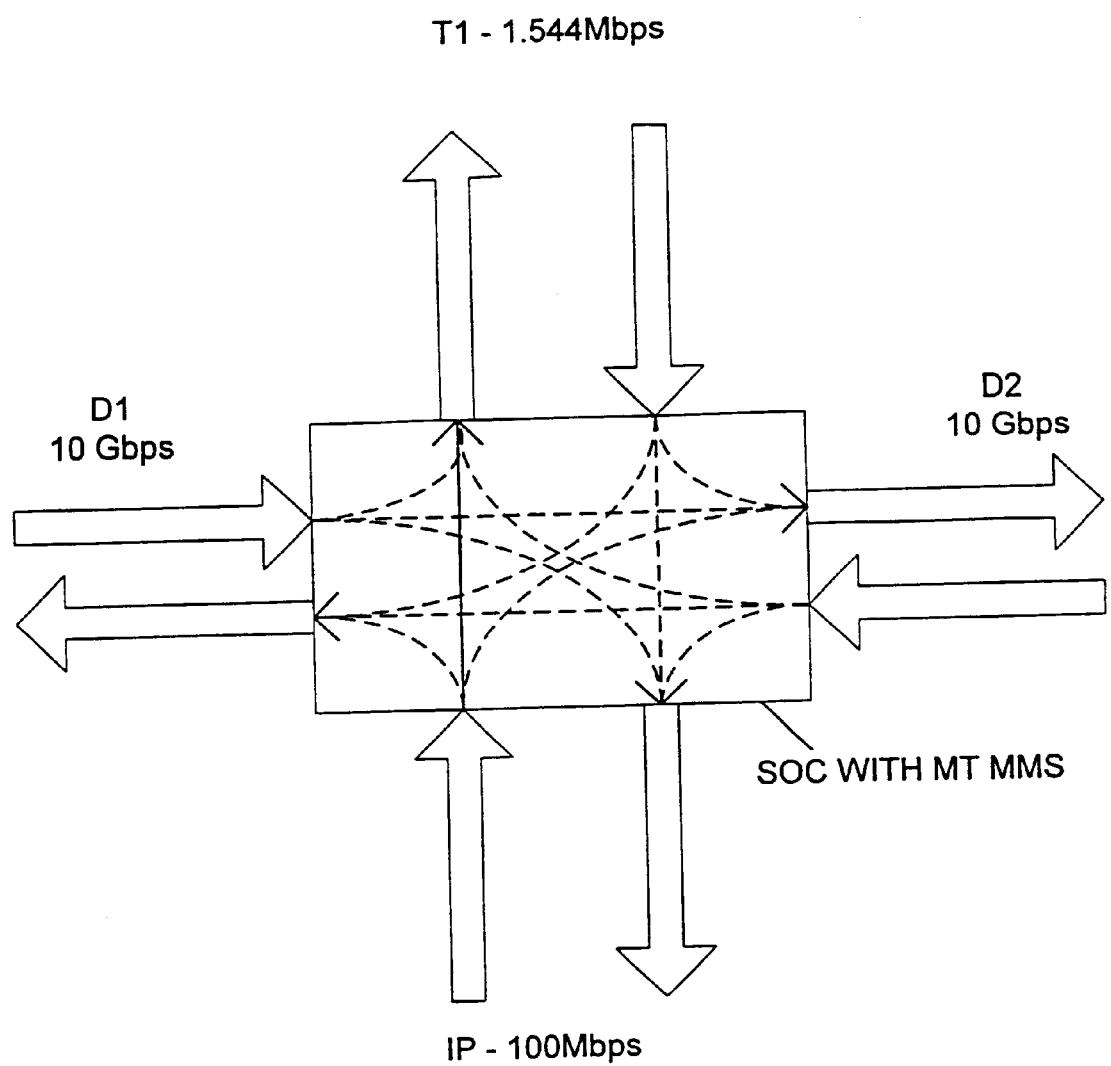

FIGS. 12A and 12C illustrate simplified diagrams of the application of the MT MMS for switching data carried from an optical network. In FIG. 12A, data from a T1 line at a rate of 1.544 Mbps can be inserted into the SOC having the MT MMS. The SOC having the MT MMS can also be connected to multiple optical networks for switching/transmitting data between them at a rate of 160 Gbps. In this manner, the SOC and the MT MMS can support both T1 and optical networks.

In FIG. 12C, the SOC having the MT MMS can also be configured to combine data from T1 at a rate of 1.544 Mbps with data from WDM fiber D1 at a rate of 10 Gbps and/or data from an IP bus at a rate of 100 Mbps. The SOC having the MT MMS can combine these data described above to transmit them in parallel using WDM fiber D2. These data inserted into the SOC can be transmitted to/from the SOC via different bus sizes. For example, the bus sizes that are used to send and receive data from T1, IP bus, or WDM fibers may be an 8, 16, 32, 64, . . . , 2048 bits wide. In this manner, the MT MMS in the SOC can cross connect various width data buses to various data rate communication networks. This technique is similar to conventional crossbar telephone switches for switching analog signals, except that the present invention can switch digital packets from various and different communication networks. These examples are described in more detail hereinafter.

FIG. 12B illustrates a system showing multiple DSPs, a VCPU, an MT MMS, and WDM fibers in accordance with the present invention. A DSP1 502 may be used for image compression, a second DSP2 (array) 504 may be used for voice compression, and a third DSP3 506 may be used for 3D graphics as described above. Each DSP is connected to the VCPU 500 via its respective FIFO1 512, FIFO2 514, and FIFO3 516, as shown. The VCPU 500 is generally occupied with processing requests from the multiple DSPs. The VCPU 500, the three DSPs 502, 504, 506, and the MT MMS having the RCPU 30D are further connected to the system bus 520. Also connected to the system bus 520 are the T1/E1 communication core 526 and ENET communication core 524. Again, dedicated memory buses 522a, 522b, 522c, 522d, 522e, and 522f connect the VCPU 500, the three DSPs 502, 504, 506, ENET 524, and T1/E1 526 to the MT MMS for sending memory requests. In addition, the MT MMS 30D is assumed to have access to two memory banks 530, 532.

In this example, four WDM fibers 540, 542, 544, 546 that are capable of transmitting data between sections of the communication network are connected to the MT MMS 30D via transceivers 528. For example, fiber 1 540 may need to be connected to fiber 4 546 for reading/writing from one section of the network. The optimal manner of fulfilling such a request is to implement the MT MMS 30D using the RCPU. In this manner, the MT MMS 30D performs such switching tasks without involving the VCPU 500. The VCPU 500 is left alone to perform system tasks associated with the DSPs without having to perform switching tasks of the communication cores of the optical network.

Figure 12D:
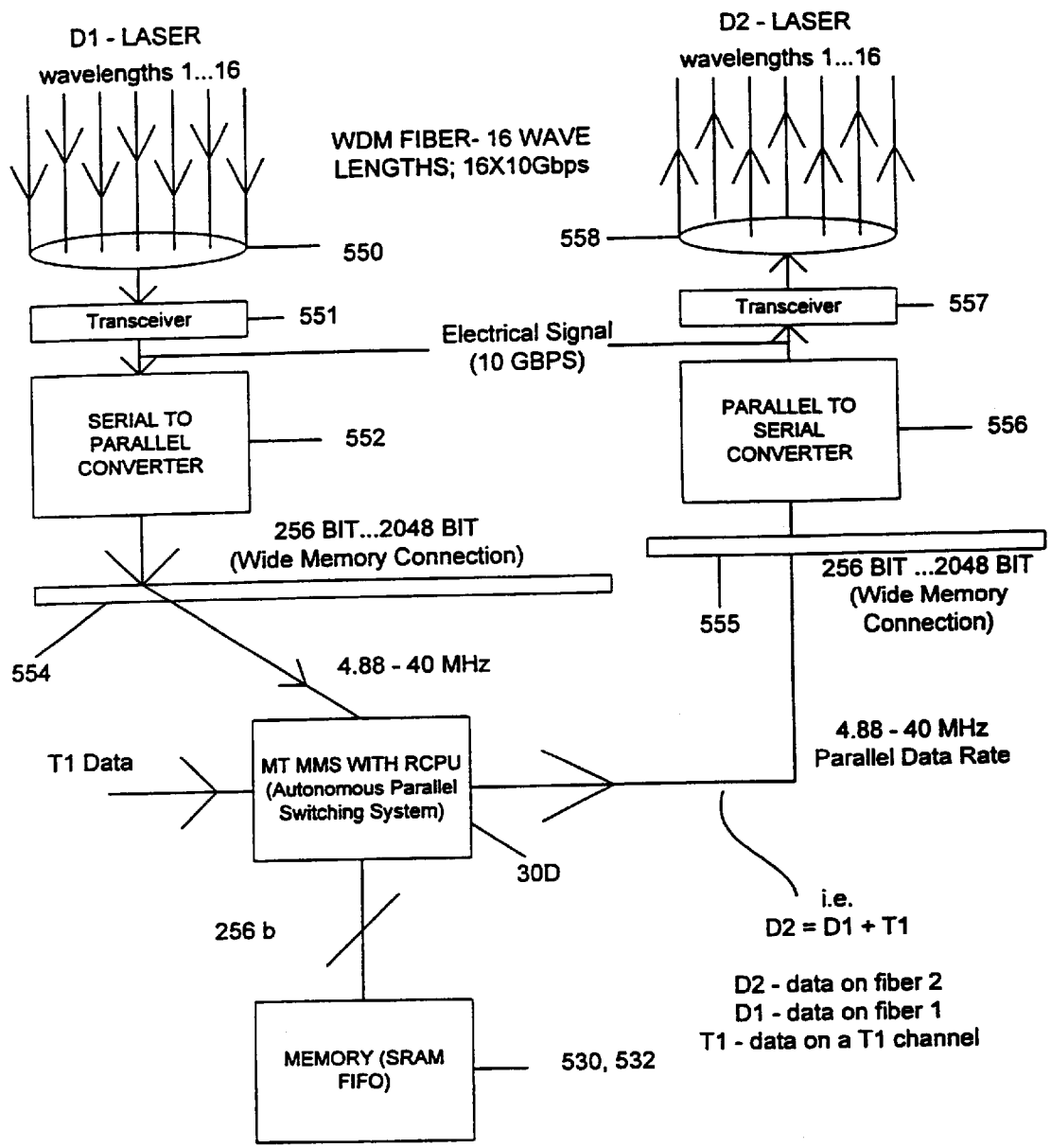

FIG. 12D illustrates a m ore detailed diagram of the switching of an optical network of the present invention. Data is transmitted from a first WDM optical fiber 550 having 16 wave length channels with a data rate of 10 Gbps. The data is next converted to electrical signals on a wide bus 554 using a transceiver 551 and a serial to parallel converter 552. The very wide bus 554 of 256 to 2048 bits is used to transmit the data to the MT MMS 30D. The MT MMS 30D performs the routing request by writing/reading from memory 530, 532. The memory request is then routed via another wide memory bus 555, a parallel to serial converter 556 and another transceiver 557 to the second WDM optical fiber 558. The parallel data rate is preferably between 4.88 to 40 MHz.

The data intercepted from the optical fibers may be processed by SOC/DSP before retransmission to another fiber. The processing may be uniformly applied to the whole data or to channels representing subsets of the data. The processing may also add data coupled from a T1 channel onto the WDM optical network by combining the additional data onto the memory 530, 532 (i.e. D2=D1+T1). Alternatively, a more complicated transfer function can be implemented such as D2=(D1-channel 1)+(T1-channel 24)+compressed (T1-channel 23). In the previous example, data from channel 1 from the D1 line, channel 24 from the T1 line, and channel 23 from the compressed T1 line are used for purposes other than for transmitting via the D2 line.

In the previous descriptions, numerous specific details are set forth, such as specific functions, components, etc., to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

I claim:

1. A method for performing multiple tasks simultaneously in a System On a Chip (SOC) device, comprising:

processing system and application tasks using a first processor, the first processor being connected to a system bus and being adapted to receive system and applications requests from a plurality of communication cores; and processing memory management tasks using a memory management system having a second processor while processing system and application tasks are being performed, the memory management system being connected to the system bus and to the plurality of communications cores through dedicated memory buses, wherein the second processor is adapted to perform at least one of memory routing and switching tasks among the plurality of communication cores.

2. The method according to claim 1, wherein processing the memory management tasks is software programmable.

3. The method according to claim 1, wherein the second processor is adapted to perform at least one of memory routing and switching tasks for multiple memory requests simultaneously.

4. The method according to claim 1 further comprising transmitting updated memory data from the second processor to the first processor.

5. The method according to claim 1, wherein processing memory management tasks includes:

inputting memory requests from the plurality of communication cores to a request buffer;

outputting the memory requests from the request buffer to a foreground request schedule and a background request schedule;

queuing the memory requests in the foreground request schedule followed by queuing the memory requests in the background request schedule; and processing simultaneously a predetermined number of memory requests.

6. The method according to claim 5, wherein the predetermined number of memory requests corresponds to the number of memory controllers in the memory management system.

7. The method according to claim 5, wherein the foreground requests correspond to requests residing in an SRAM buffer.

8. A memory management system for routing or switching stream data among a plurality of peripheral masters on a System on a Chip (SOC) device, the system comprising:

a multiplexer for selecting a predetermined number of peripheral memory requests from the plurality of peripheral masters;

a multi tasking arbiter and load balancing system coupled to the multiplexer and adapted to provide an arbitration, load balancing and scheduling scheme to the multiplexer;

a bus bridge for receiving a system request from a system master; and a routing CPU coupled to the multiplexer and the bus bridge for processing both the peripheral memory requests and the system request.

9. A system according to claim 8, wherein the arbitration, load balancing and scheduling scheme comprises one of a round robin, psuedo-random, priority, and fixed bandwidth assignment per master.

10. A System On a Chip (SOC) device comprising:

a virtual master for processing system and application tasks requested by a plurality of peripheral masters, the plurality of peripheral masters adapted to transmit memory requests associated with one or more memory banks; and a memory management system having a routing master for receiving and processing the memory requests from the plurality of peripheral masters.

11. The SOC device according to claim 10, wherein the memory management system is software programmable.

12. The SOC device according to claim 11, wherein the memory management system is programmed to receive and process memory requests from a first predetermined number of peripheral masters.

13. The SOC device according to claim 12, wherein the memory management system is reprogrammed to receive and process memory requests from a second predetermined number of peripheral masters different from the first predetermined number of peripheral masters.

14. The SOC device according to claim 10, wherein the memory management system receives the memory requests from a plurality of dedicated memory buses.

15. The SOC device according to claim 14, wherein the plurality of dedicated memory buses connect the plurality of peripheral masters to-the routing master.

16. The SOC device according to claim 14, wherein the plurality of dedicated memory buses comprise non-arbitrated buses.

17. The SOC device according to claim 14, wherein the plurality of dedicated memory buses are used to decode memory addresses.

* * * * *